US006657937B2

(12) United States Patent
Tanoue et al.

(10) Patent No.: US 6,657,937 B2
(45) Date of Patent: Dec. 2, 2003

(54) INFORMATION RECORDING MEDIUM WHERE ADDRESS MARK COMPRISING PATTERN SUITABLE FOR PREVENTION OF DETECTION ERROR IS RECORDED, AND CUTTING APPARATUS FOR REPRODUCING THE INFORMATION RECORDING MEDIUM

(75) Inventors: Koki Tanoue, Yokohama (JP); Hideaki Osawa, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/237,867

(22) Filed: Sep. 10, 2002

(65) Prior Publication Data

US 2003/0021209 A1 Jan. 30, 2003

Related U.S. Application Data

(62) Division of application No. 09/725,493, filed on Nov. 30, 2000, now Pat. No. 6,473,381, which is a division of application No. 09/070,882, filed on May 1, 1998, now Pat. No. 6,215,759.

(30) Foreign Application Priority Data

May 1, 1997 (JP) .............................................. 9-113877

(51) Int. Cl.[7] ................................................. G11B 7/00
(52) U.S. Cl. ................................ 369/59.24; 369/275.3; 369/47.51
(58) Field of Search ........................... 369/59.24, 275.3, 369/47.1, 47.27, 59.22, 59.23, 59.25, 47.51

(56) References Cited

U.S. PATENT DOCUMENTS

| 5,075,805 | A | | 12/1991 | Peddle et al. |
| 5,170,299 | A | | 12/1992 | Moon |
| 5,231,545 | A | | 7/1993 | Gold |
| 5,241,546 | A | | 8/1993 | Peterson et al. |
| 5,420,730 | A | | 5/1995 | Moon et al. |
| 5,796,543 | A | | 8/1998 | Ton-that |
| 5,933,410 | A | | 8/1999 | Nakane et al. |
| 5,956,196 | A | | 9/1999 | Hull et al. |
| 6,487,151 | B1 | * | 11/2002 | Nagata et al. ........... 369/59.24 |

FOREIGN PATENT DOCUMENTS

| JP | 61-261873 | | 11/1986 |
| JP | 5-159462 | | 6/1993 |
| JP | 5-225170 | | 9/1993 |
| JP | 5-342772 | | 12/1993 |
| JP | 6-267075 | A | 9/1994 |

* cited by examiner

Primary Examiner—Nabil Hindi
(74) Attorney, Agent, or Firm—Pillsbury Winthrop LLP

(57) ABSTRACT

In an information recording medium including a plurality of sector fields and having various pieces of information recorded in the sector fields, the header field in each sector field includes a first field in which a continuously repeated pattern complying with the run length limitation is recorded in the predetermined range, a second field in which an address mark including a violation pattern different from a reproduced pattern obtained by reproducing the repeated pattern when a defective pit which cannot be recognized as a pit is included in pits representing the repeated pattern is recorded, the violation pattern exceeding the run length limitation in the predetermined range, and a third field in which address data is recorded.

3 Claims, 16 Drawing Sheets

| | | ROTATIONAL SPEED (Hz) | NUMBER OF SECTORS PER TRACK |
|---|---|---|---|
| LEAD-IN AREA | EMBOSSED DATA ZONE | 37.57 | 18 |
| | REWRITABLE DATA ZONE | 39.78 | 17 |
| DATA AREA | 3a ZONE 0 | 39.78 | 17 |
| | 3b ZONE 1 | 37.57 | 18 |
| | 3c ZONE 2 | 35.59 | 19 |
| | ⋮ | ⋮ | ⋮ |
| | 3x ZONE 23 | 16.91 | 40 |
| LEAD-OUT AREA | | 16.91 | 40 |

FIG. 3

48 CHANNEL BITS: 000100010000000000000001000100010000000000010001

SPACE ———
MARK - - -

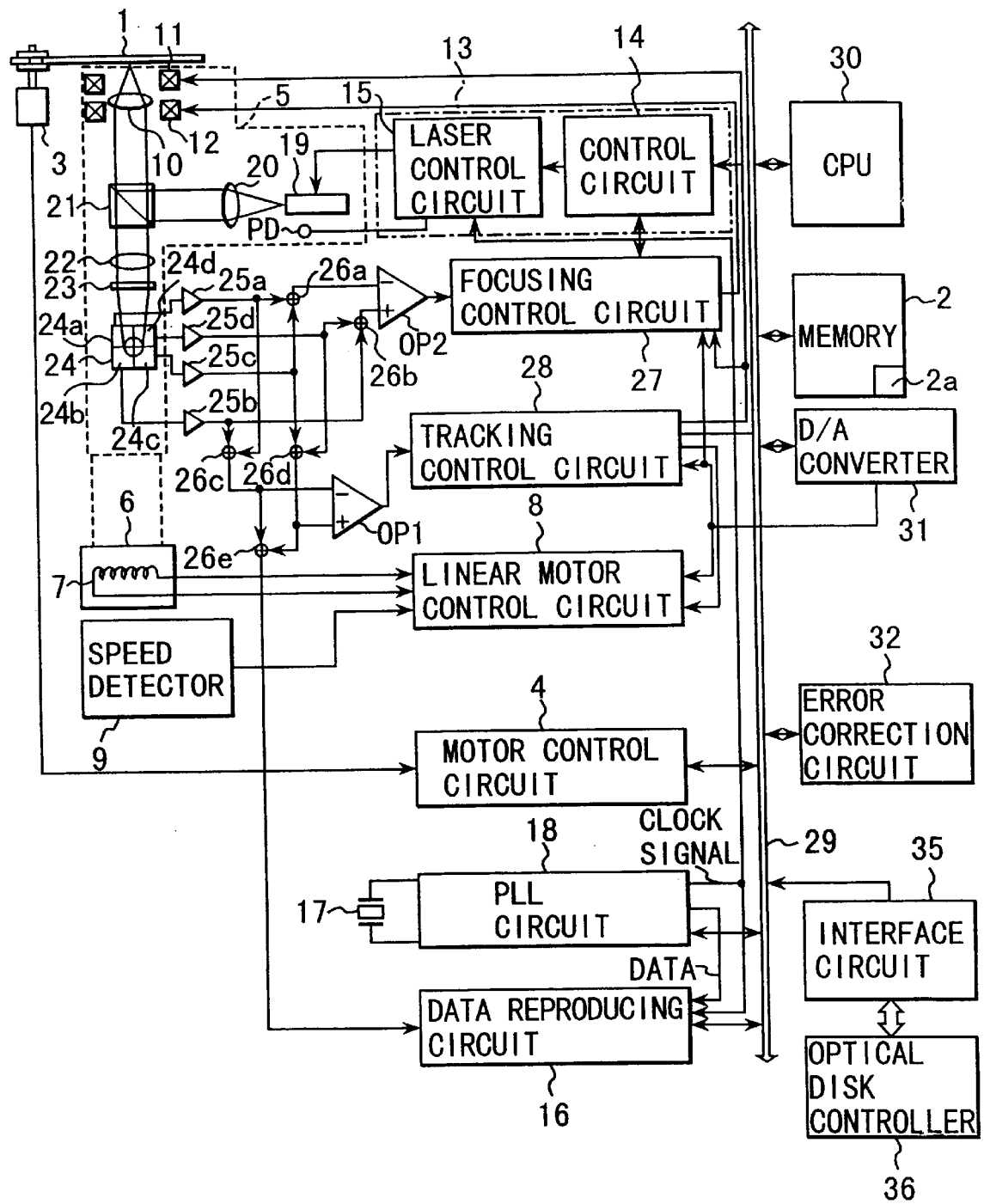
F I G. 16

INFORMATION RECORDING MEDIUM WHERE ADDRESS MARK COMPRISING PATTERN SUITABLE FOR PREVENTION OF DETECTION ERROR IS RECORDED, AND CUTTING APPARATUS FOR REPRODUCING THE INFORMATION RECORDING MEDIUM

This application is a divisional of application Ser. No. 09/725,493 filed Nov. 30, 2000, now U.S. Pat. No. 6,473,381 which is a divisional of application Ser. No. 09/070,882 filed May 1, 1998, now U.S. Pat. No. 6,215,759 the contents of which are incorporated herein in their entirety.

BACKGROUND OF THE INVENTION

The present invention relates to an information recording medium such as a DVD (Digital Versatile Disk)-RAM (Random Access Memory) which is used to record predetermined information. The present invention also relates to a cutting apparatus for recording header data on a master for the information recording medium by exposure. Furthermore, the present invention relates to an information reproducing apparatus for reproducing the information recorded on the information recording medium. More specifically, the present invention relates to an address mark indicating the recording position of address data included in header data.

A plurality of sector fields are formed on an optical disk as the above information recording medium. Each of these sector fields includes a header field and a recording field. Header data is recorded in the header field in advance by embossing. User data is recorded in the recording field by using phase change.

A VFO (Voltage Frequency Oscillator) field, an AM (Address Mark) field, and a PID (Physical ID) field are sequentially arranged in the header field. A continuously repeated pattern is recorded in the VFO field. An address mark indicating the recording position of address data is recorded in the AM field by embossing. Various data including address data are recorded in the PID field by embossing.

Data are recorded on such an optical disk by using run length limited code sequences having their run lengths limited in a predetermined range except for specific fields (e.g., AM fields). A run length represents the number of consecutive, identical channel bits. No run length code sequence includes a run of 1s (in channel bits). A run length in this specification therefore represents a run of 0s (in channel bits). For example, data to be recorded according to a run length limitation corresponding to run lengths of 2 to 10 includes no consecutive 1s. In addition, the run length of 0s between is is limited to 2 to 10. Such a run length limitation corresponding to run lengths of 2 to 10 is abbreviated as RLL (2, 10). Note that RLL is an abbreviation for "Run Length Limited".

Data to be recorded in each recording field of the optical disk is encoded into fixed-length block codes. A fixed-length block code is a code which is generated by encoding data at a constant ratio of code words to data words, e.g., 2:1. In demodulating such a fixed-length block code, if a block boundary is mistaken, proper modulation cannot be performed. For this reason, an address mark is recorded in an AM field set before encoded data to allow detection of a proper block boundary in reproducing data, thereby demodulating the data. If a portion on which data is recorded is mistaken as an address mark, subsequent data cannot be normally demodulated.

Note that in the edge recording scheme, NRZI (Non Return to Zero Inverted) processing is performed to invert the polarity of data at a position corresponding to each channel bit "1".

If pits representing a repeated pattern recorded in the above VFO field includes a defective pit which cannot be recognized as a pit, the following problem is posed. When the header field having a VFO field including a defective pit is reproduced, the reproduced pattern obtained is affected by the defective pit. The reproduced pattern affected by the defective pit then causes a detection error of an address mark. If an address mark is erroneously detected, the proper address data cannot be obtained. As a result, the optical disk cannot be normally played.

BRIEF SUMMARY OF THE INVENTION

It is an object of the present invention to provide the following information recording medium, cutting apparatus, and information reproducing apparatus.

(1) It is the first object of the present invention to provide an information recording medium on which an address mark which can be normally detected even if a defective pit included in a VFO field is recorded.

(2) It is the second object of the present invention to provide a cutting apparatus which records, on a master for an information recording medium by exposure, an address mark which can be normally detected even if a defective pit is included in a VFO field.

(3) It is the third object of the present invention to provide an information reproducing apparatus which reproduces address data in accordance with an address mark which can be normally detected even if a defective pit is included in a VFO field.

In order to solve the above problem and achieve the above objects, according to the present invention, an information recording medium, a cutting apparatus, and an information reproducing apparatus have the following arrangements.

(1) There is provided an information recording medium including a plurality of sector fields and having various pieces of information recorded in the sector fields, characterized in that the sector field comprises a header field in which an address mark including a violation pattern exceeding a run length limitation in a predetermined range and address data complying with the run length limitation in the predetermined range, a recording position of which is indicated by the address mark, are recorded, and a recording field on/from which data is recorded/reproduced on the basis of the data recorded in the header field.

(2) There is provided a cutting apparatus for recording header data, by exposure, on a master for an information recording medium on which various pieces of information are recorded, characterized by comprising recording means for recording an address mark including a violation pattern exceeding a run length limitation in a predetermined range and address data complying with the run length limitation in the predetermined range, a recording position of which is indicated by the address mark, by exposure.

(3) There is provided an information reproducing apparatus for reproducing information recorded on an information recording medium on which various pieces of information are recorded, characterized by comprising address mark detection means for detecting an address mark from a header field in which the address mark including a violation pattern exceeding a run length limitation in a predetermined range and address data complying with the run length limitation in the predetermined range, a recording position of which is indicated by the address mark, are recorded, and reproducing means for reproducing the address data in accordance with the address mark detected by the address mark detection means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view showing the rotational speed corresponding to each zone on the optical disk and the number of sectors per track in each zone;

FIG. 16 is a block diagram showing the schematic arrangement of an optical disk apparatus as an information reproducing apparatus.

DETAILED DESCRIPTION OF THE INVENTION

An embodiment of the present invention will be described below with reference to the accompanying drawing.

Figure 1:
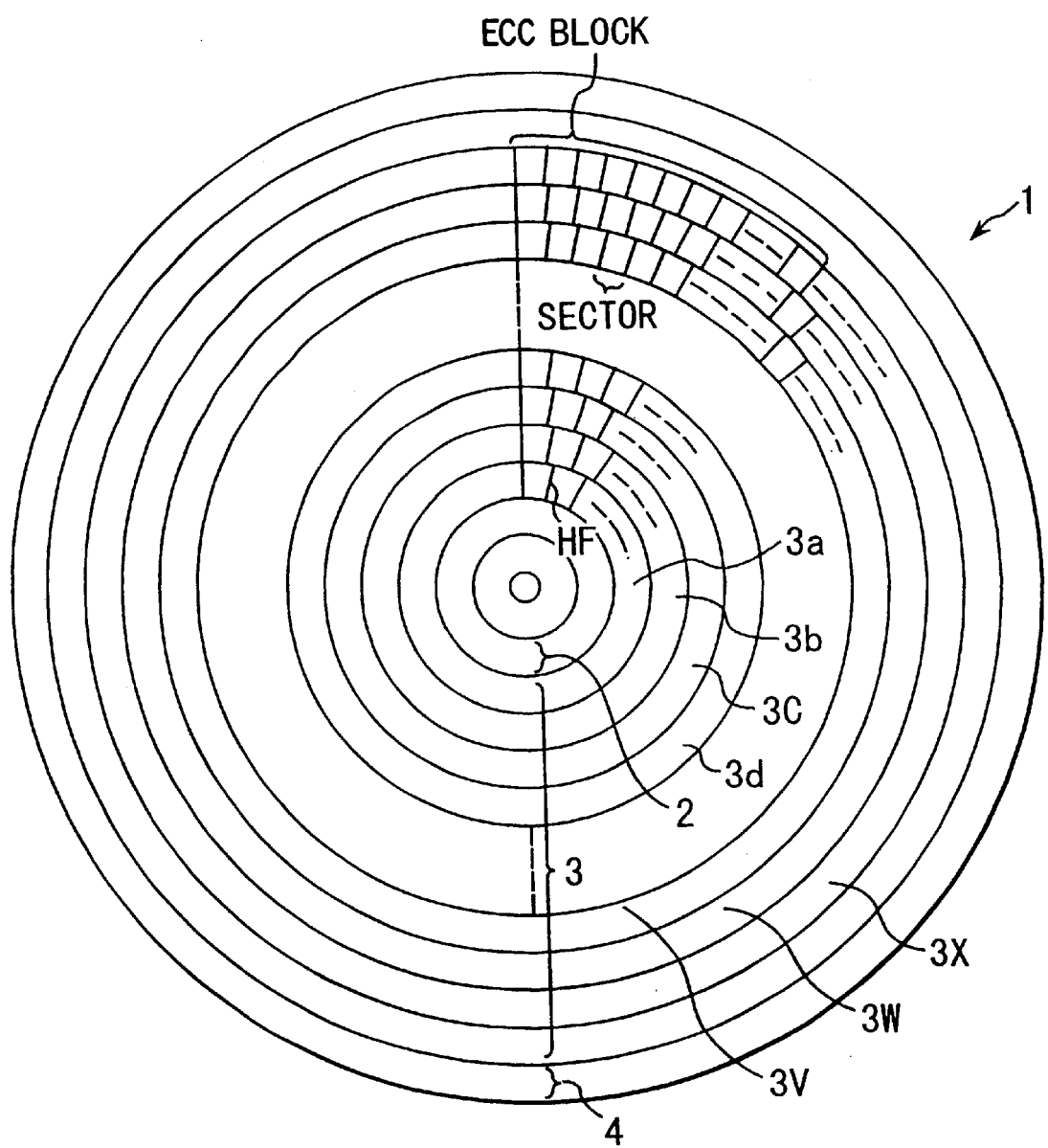
FIG. 1 is a view for explaining the zones on an optical disk.
Figure 2:
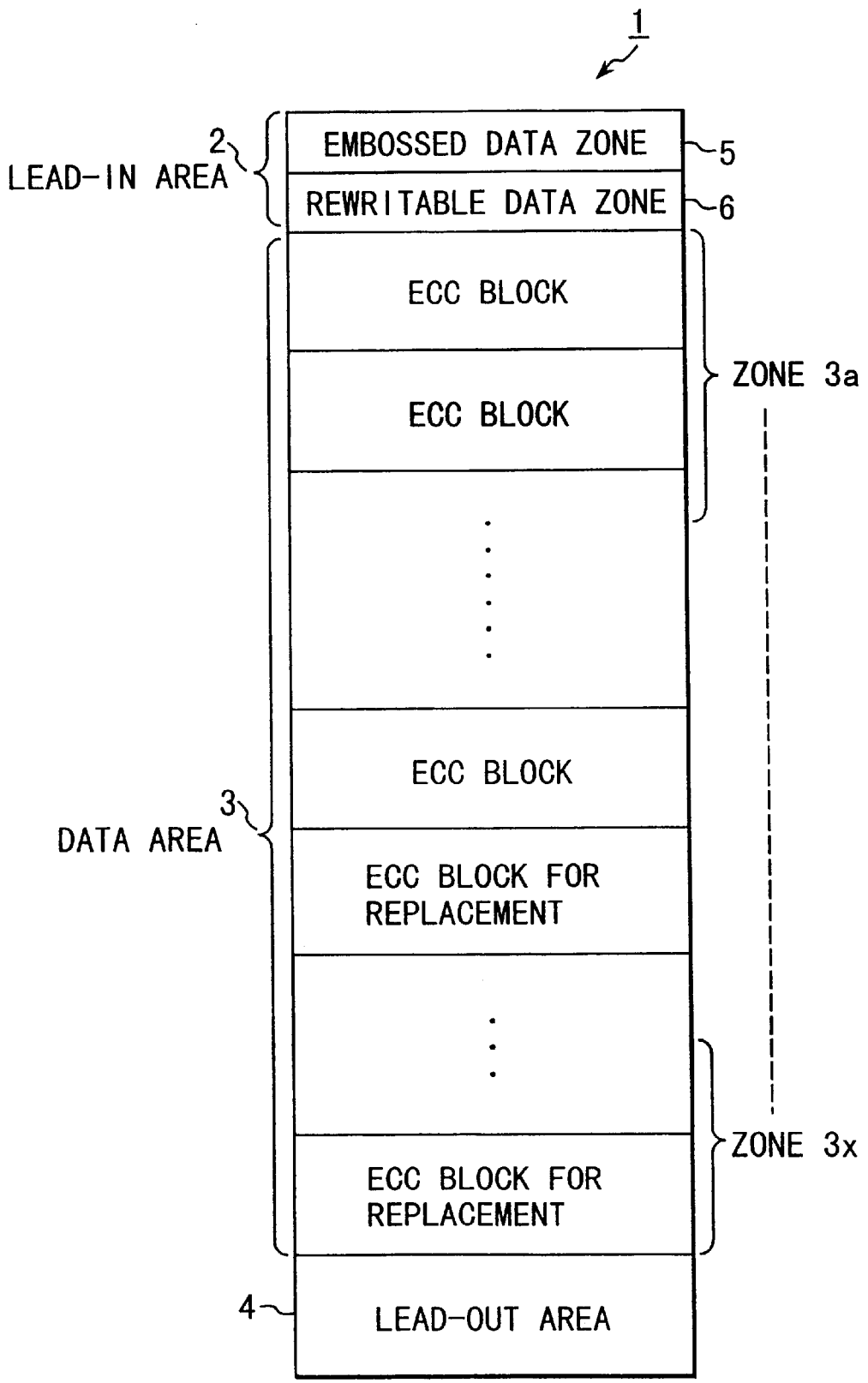
FIG. 2 is a view schematically showing the data structure on the optical disk.
Figure 4:
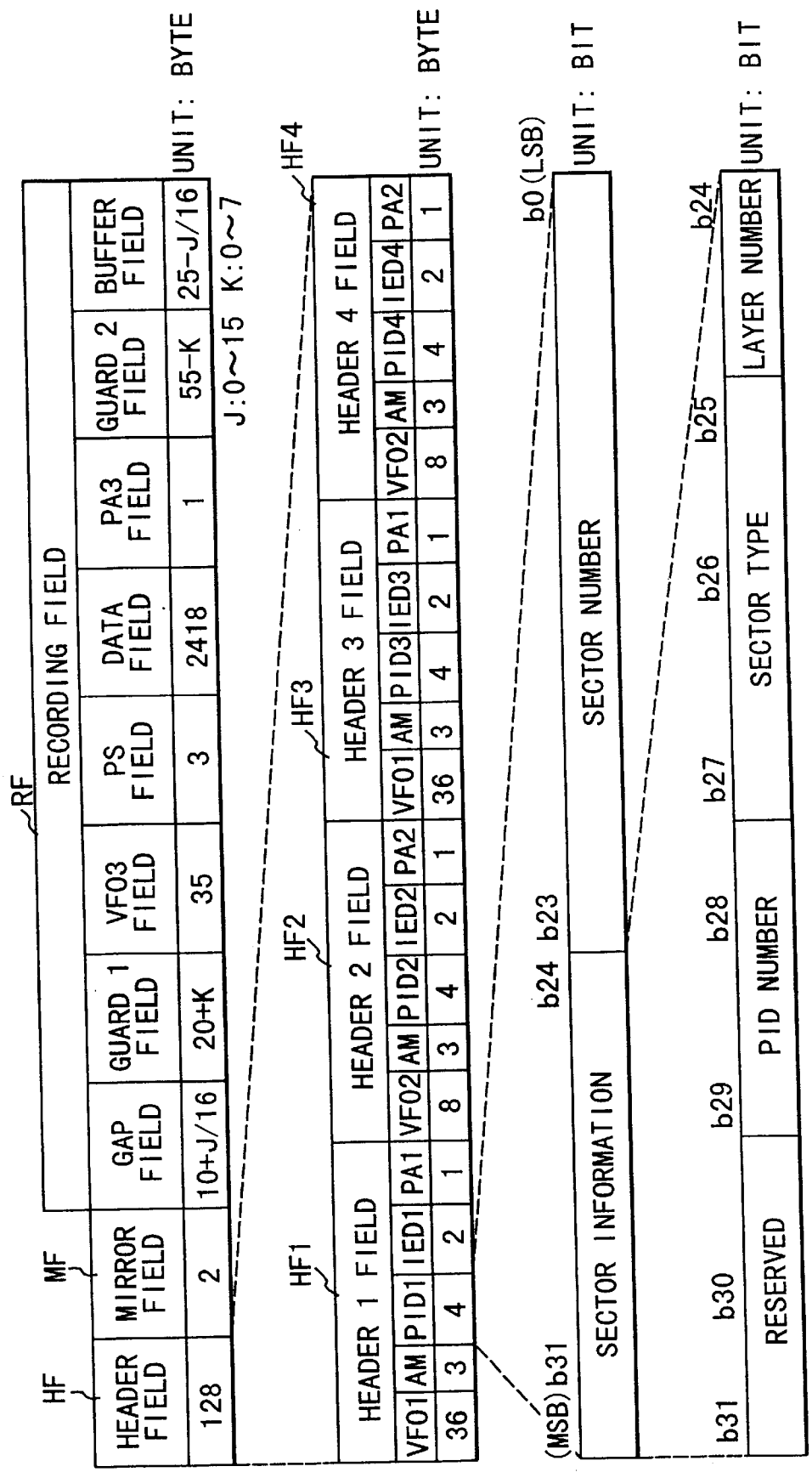
FIG. 4 is a view showing the sector format of the optical disk.
Figure 5:
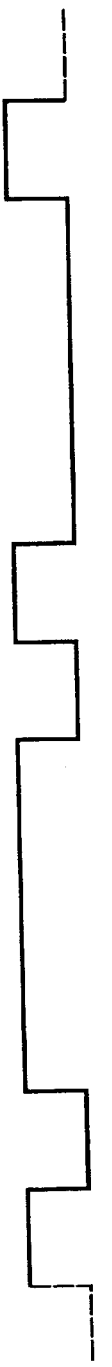
FIG. 5 is a chart showing an example of an address mark.

A DVD-RAM as an optical disk (information recording medium) will be briefly described with reference to FIGS. 1 to 5. FIG. 1 is a view for explaining the zones on the optical disk. FIG. 2 shows the schematic data structure on the optical disk. FIG. 3 shows the rotational speeds corresponding to the respective zones and the number of sectors per track in each zone. FIG. 4 schematically shows the sector format of the optical disk. FIG. 5 shows an address mark.

An optical disk 1 is formed by coating the surface of a circular substrate made of a glass or plastic material or the like with a metal film made of tellurium, bismuth, or the like in the form of a doughnut. Concentric or spiral tracks (land tracks and groove tracks) are formed on the optical disk 1. These tracks include a plurality of sector fields each having a predetermined track length.

As shown in FIGS. 1 and 2, the data recording area of the optical disk 1 includes a lead-in area 2, a data area 3, and a lead-out area 4. Each area includes a plurality of zones. Each zone includes a plurality of tracks.

An embossed data zone 5 and a rewritable data zone 6 are set in the lead-in area 2. A reference signal and control data are recorded in the embossed data zone 5 at the time of the manufacture of the optical disk. A guard track zone, a disk test zone, a drive test zone, a disk identification data zone, a replacement management zone, and the like are set in the rewritable data zone 6. A plurality of zones (zones $3a, \ldots, 3x$) are set in the data area 3. User data is recorded in this data area 3. The lead-out area 4 is a rewritable data zone. Data having the same contents as those of the data recorded in the rewritable data zone 6 is recorded in the lead-out area 4.

The numbers of sectors per track differ between the inner and outer peripheral sides of the optical disk 1. That is, the numbers of sectors per track on the outer peripheral side are larger than those on the inner peripheral side. For this reason, as shown in FIG. 3, the number of revolutions (rotational speed) of the optical disk 1 changes in units of zones. In other words, the rotational speed of the optical disk 1 decreases as the track to be subjected to reproduction/recording shifts from the inner peripheral side to the outer peripheral side.

As shown in FIGS. 1 and 2, data are recorded on each track in the zones $3a, \ldots, 3x$ of the data area 3 in units of ECC (Error Correction Code) blocks.

The sector format will be described next with reference to FIG. 4.

As shown in FIG. 4, one sector is constituted by about 267 bytes. Data modulated by 8-16 modulation is recorded on this sector. The 8-16 modulation is a modulation scheme of modulating an 8-bit input code sequence into a 16-bit output code sequence. The input code sequence is called input bits, and the output code sequence is called channel bits. Note that one byte is equivalent to 16 channel bits.

The details of one sector will be described below. One sector includes 128-byte header field HF, 2-byte mirror field MF, and 2,567-byte recording field RE.

Header data is recorded in header field HF by embossing in the process of manufacturing an optical disk. Header data is written four times in header field HF to attain high header data detection precision. That is, header field HF includes header 1 field HF1, header 2 field HF2, header 3 field HF3, and header 4 field HF4 in which substantially identical data are recorded. Each of header 1 field HF1 and header 3 field HF3 is constituted by 46 bytes. Each of header 2 field HF2 and header 4 field HF4 is constituted by 18 bytes.

Header 1 field HF1 includes a 36-byte VFO (Voltage Frequency Oscillator)1 field, a 3-byte AM (Address Mark) field, a 4-byte PID (Physical ID)1 field, a 2-byte IED (ID Error Detection Code)1 field, and a 1-byte PA (Post Ambles)1 field.

Header 2 field HF2 includes an 8-byte VFO2 field, a 3-byte AM field, a 4-byte PID2 field, a 2-byte IED2 field, and a 1-byte PA2 field.

Header 3 field HF3 includes a 36-byte VFO2 field, a 3-byte AM field, a 4-byte PID3 field, a 2-byte IED3 field, and a 1-byte PA1 field.

Header 4 field HF4 includes an 8-byte VFO2 field, a 3-byte AM field, a 4-byte PID4 field, a 2-byte IED4 field, and a 1-byte PA2 field.

Sector information and a sector number are recorded as address data in each of the PID1 field, the PID2 field, the PID3 field, and the PID4 field.

A continuously repeated pattern ("000100010001 . . . ") is recorded in each of the VFO1 field and the VFO2 field. This repeated pattern is to ensure reliable reproduction of data from the optical disk even when rotation of the optical disk varies. When the rotation of the optical disk varies, the repeated pattern in the VFO field varies at the same time. For this reason, a clock is generated to lock the PLL (Phase Locked Loop) to this repeated pattern so as to read out data. With this operation, the data can be reliably reproduced.

An address mark is recorded in each AM field. The address mark serves to detect the boundary between blocks. This address mark indicates the recording position of the address data of a PIDn field. The address mark includes a violation pattern violating a predetermined run length limitation. For example, the address mark includes a violation pattern (in channel bits) "100000000000001" which violates a run length limitation corresponding to run lengths of 2 to 10. In RLL (2, 10) codes, a pattern with a run length of 13 0s does not exist. That is, the inclusion of the pattern with a run length of 13 0s in the address mark prevents another pattern from being mistaken as an address mark.

The address mark (in channel bits) in the present invention is "000100010000000000001000100010000000000000010001", as shown in FIG. 5. The address mark in the present invention has a length of 48 channel bits. The following are the run lengths (runs of 0s) of this address mark in the order arranged: 3, 3, 13, 3, 3, 13, 3. This means that in the address mark a pattern "0001000100000000000001" including an odd number of (e.g., three) 1s repeats itself an even number of (e.g., two) times. With this pattern, the DC components are canceled out. In addition, "0001", part of the repeated pattern recorded in the VFO field, is recorded in the VFO field to be adjacent to the violation pattern "00000000000001".

An error detection code for PID1 is recorded in the IED1 field. Similarly, error detection codes for PID2, PID3, and PID4 are respectively recorded in the IED2 field, the IED3 field, and the IED4 field.

State information necessary for demodulation is recorded in each PA field. In addition, each PA field serves to adjust polarity such that header field HF ends with a space.

Mirror field MF is a field in which no data is recorded.

Recording field RF mainly serves as a field in which user data is recorded. Recording field RF includes a (10+J/16)-byte gap field, a (20+K)-byte guard 1 field, a 35-byte VFO3 field, a 3-byte PS (Pre-Synchronous code) field, a 2,418-byte data field, a 1-byte PA3 field, a (55−K)-byte guard 2 field, and a (25−J/16)-byte buffer field. Note that J is a random value from 0 to 15, and K is a random value from 0 to 7. With these numbers, the start position of data write is randomly shifted. As a result, degradation in recording film due to overwrite is suppressed.

The gap field is a field in which no data is recorded.

The guard 1 field is a field for preventing the VFO3 field from being affected by start portion degradation due to repeated overwrites, which is a marked characteristic of a phase change recording film. The above continuously repeated pattern is recorded in the VFO3 field. A sync code is recorded in the PS field.

In the data field, a 4-byte data ID, a 2-byte data ID error correction code IED (Data ID Error Detection Code), a sync code, an ECC (Error Correction Code), an EDC (Error Detection Code), 2,048-byte user data, and the like are recorded. The data ID is data indicating sector ID1 to sector ID16. The data ID error correction code IED is an error correction code for correcting a data ID error.

State information necessary for demodulation is recorded in the post ambles PA3 field. This post ambles PA3 field also serves as a field indicating the end of the last byte of the preceding data field.

The guard 2 field is a field for preventing the data field from being affected by end portion degradation due to repeated recording, which is also a marked characteristic of a phase change recording film.

The buffer field is a field for absorbing variations in rotation of the optical disk 1 to prevent the data field from overlapping the subsequent header field.

The PID fields (PID1 field, PID2 field, PID3 field, and PID4 field) will be described in detail next. Each PID field is constituted by a 1-byte (8-bit) sector information field and a 3-byte (24-bit) sector number field. A sector address is recorded in the sector number field.

The sector information is constituted by a 2-bit reserved field, a 2-bit PID number field, a 3-bit sector type field, and a 1-bit layer number field.

No specific data is recorded in the reserved field.

A PID number is recorded in the PID number field. For example, "00" representing PID1 is recorded in the PID number field in header 1 field HF1; "01" representing PID2, in the PID number field in header 2 field HF2; "10" representing PID3, in the PID number field in header 3 field HF3; and "11" representing PID4, in the PID number field in header 4 field HF4.

Land and groove tracks are identified from the sector numbers recorded in the sector number fields in header 1 field HF1 to header 4 field HF4.

The following data are recorded in the sector type field: "000" representing a read only sector (Read only sector); "001", "010", or "011" representing a reserved sector (Reserved); "100" representing the first rewritable sector of a land or groove track (Rewritable first sector); "101" representing the last rewritable sector of a land or groove track (Rewritable last sector); "110" representing a sector before the last rewritable sector of a land or groove track (Rewritable before last sector); and "111" representing another rewritable sector of a land or groove track (Rewritable other sector).

In the layer number field, a "1" or "0" representing layer 1 or layer 0 is recorded.

Figure 6A:
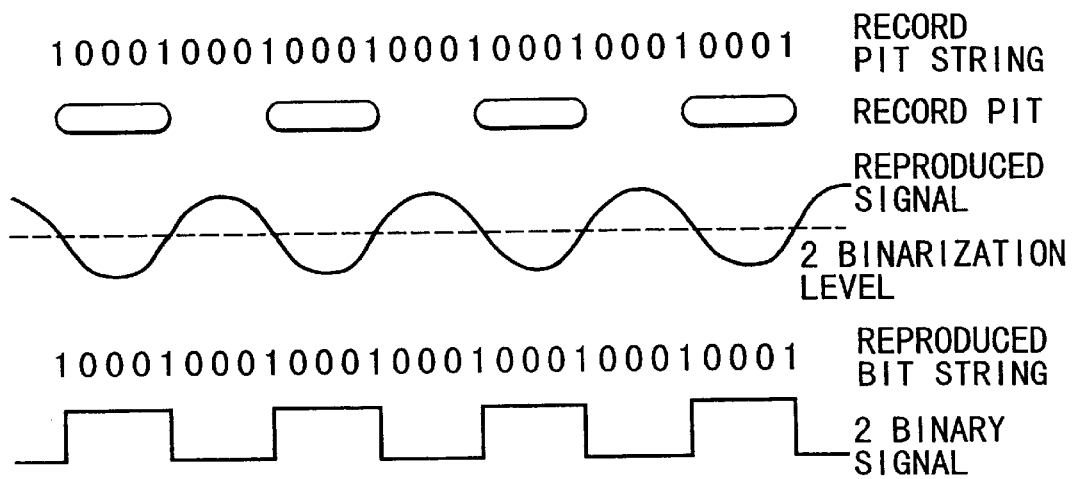
FIG. 6A is a timing chart showing a state in which a normally recorded VFO area is reproduced with a normal binarization level.
Figure 6B:
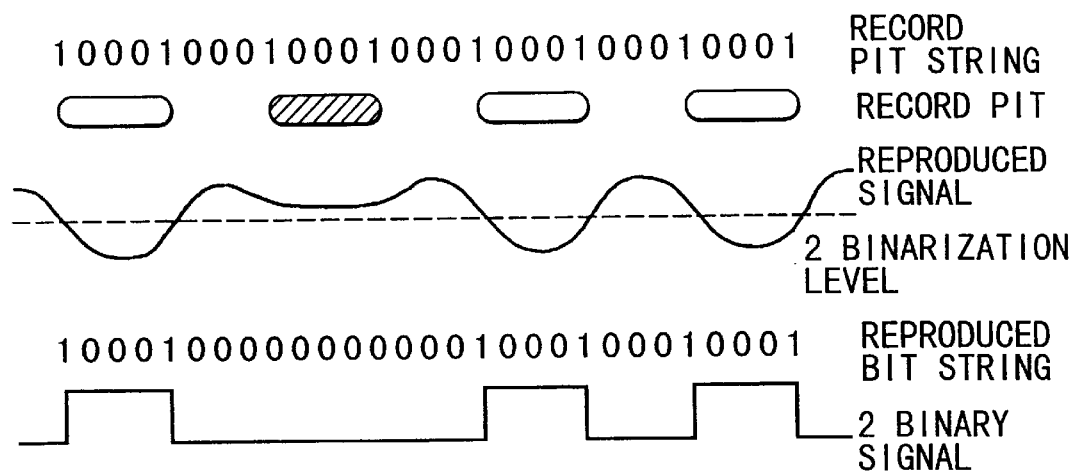
FIG. 6B is a timing chart showing a state in which a VFO area including a defective pit is reproduced with the normal binarization level.
Figure 6C:
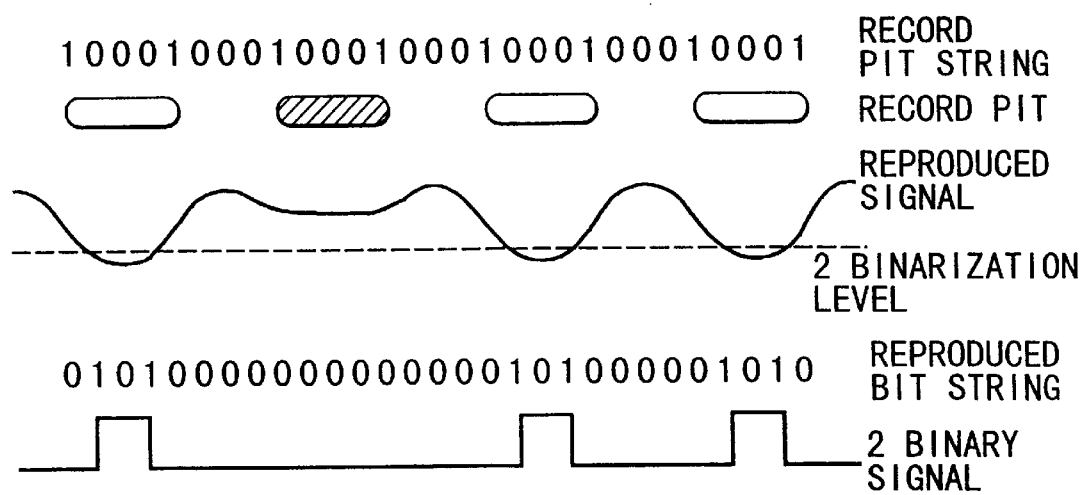
FIG. 6C is a timing chart showing a state in which a VFO area including a defective pit is reproduced with a shifted binarization level.

An example of detection error of the repeated pattern recorded in a VFO field will be described next with reference to FIGS. 6A to 6C. A pattern "0001" in channel bits is repeatedly recorded in the VFO field. When the period of such a repeated pattern is represented by a channel clock period T, the period becomes 4T. For this reason, this pattern is also called a 4T pattern. Record pits are formed such that a position corresponding to a channel bit "1" coincides with the start or end point of each record pit. Referring to FIGS. 6A to 6C, the elliptical marks represent the record pits.

FIG. 6A shows a state in which the normally recorded VFO pattern is normally detected. In this case, the solid curve represents the waveform of the reproduced signal obtained from the pit string. This reproduced signal is converted into a binary signal with the binarization level indicated by the dashed line. For example, the binarization level is determined by calculating a DSV (Digital Sum Value) from the duty of the binary signal, and performing feedback control using the calculated value as a deviation. Each edge of the binary signal corresponds to a "1" of the reproduced bit string.

FIG. 6B shows a state in which an abnormally recorded VFO pattern is detected. For example, the abnormally recorded VFO pattern is a VFO pattern including a record pit with insufficient depth/height. Referring to FIG. 6B, the record pit with insufficient depth/height is indicated by hatching. Such a record pit with insufficient depth/height is formed when, for example, a lack of filling resin locally occurs in a mastering process, a pit defect is present in a disk substrate owing to some cause, or dust adheres to the disk. Subsequently, the pits indicated by hatching will be referred to as defective pits.

A defective pit has a depth (when the pit is a concave) smaller than $\lambda/4$ at which the maximum reflectance change can be theoretically obtained. For this reason, the level of the reproduced signal does not sufficiently decrease at the defective pit position. In this case, $\lambda$ represents the laser wavelength, which is, for example, set to 650 nm. In this case, the defective pit is not recognized as a pit. As a result, a 12T pattern, which does not exist among RLL (2, 10) codes, is detected, as shown in FIG. 6B.

The address mark recorded in the AM field includes a violation pattern "100000000000001" which violates a run length limitation in a predetermined range. More specifically, even a violation pattern violating the run length limitation includes a violation pattern exceeding the upper limit value of the run length limitation.

When an area including a defective pit is reproduced, an erroneously reproduced signal is inevitably obtained. The address mark recorded on the AM field serves to detect a block boundary. This address mark is set immediately after the VFO field. That is, a repeated VFO pattern is always recorded before each address mark. When record pits representing this repeated VFO pattern include a defective pit, a violation pattern which is discordant with the run length limited codes in the predetermined range is generated. A defective pit in a repeated VFO pattern greatly differs from a defective pit included in arbitrary data in this respect.

The present invention exploits this aspect to prevent a detection error of an address mark. More specifically, when a defective pit which is not recognized as a pit is included in a VFO field, a violation pattern different from a reproduced pattern affected by this defective pit is included in an address mark. This prevents any pattern from being mistaken as an address mark owing to a reproduced pattern affected by a defective pit. FIG. 5 shows an example of an address mark.

The violation pattern included in the address mark shown in FIG. 5 never appears in a reproduced pattern affected by a defective pit like the one shown in FIG. 6B. Obviously, this violation pattern never appears in a reproduced pattern affected by more than one defective pit.

FIG. 6C shows a state in which an abnormally recorded VFO pattern is erroneously detected. The abnormally recorded VFO pattern is a pattern including a defective pit like the one described above. In this case, the state in which the pattern is erroneously detected indicates a state in which the pattern is detected with a binary level which deviates from the proper level for some reason. The binary level deviates from the amplitude center of the reproduced signal in the VFO field in the presence of a large defect.

In the state shown in FIG. 6C, the binary level deviates to the lower side with respect to the reproduced signal. In this case, a violation pattern with a run length of 13 is detected. That is, a pattern identical to the violation pattern included in the address mark shown in FIG. 5 is detected.

In the address mark in FIG. 5, however, part of the repeated VFO pattern recorded in the VFO field is present adjacent to the violation pattern exceeding the run length limitation. For this reason, this address mark always becomes a pattern different from the reproduced pattern shown in FIG. 6C.

As the address mark shown in FIG. 5 is used, it can be accurately detected even if the pattern shown in FIG. 6B or 6C is reproduced.

Figure 7:
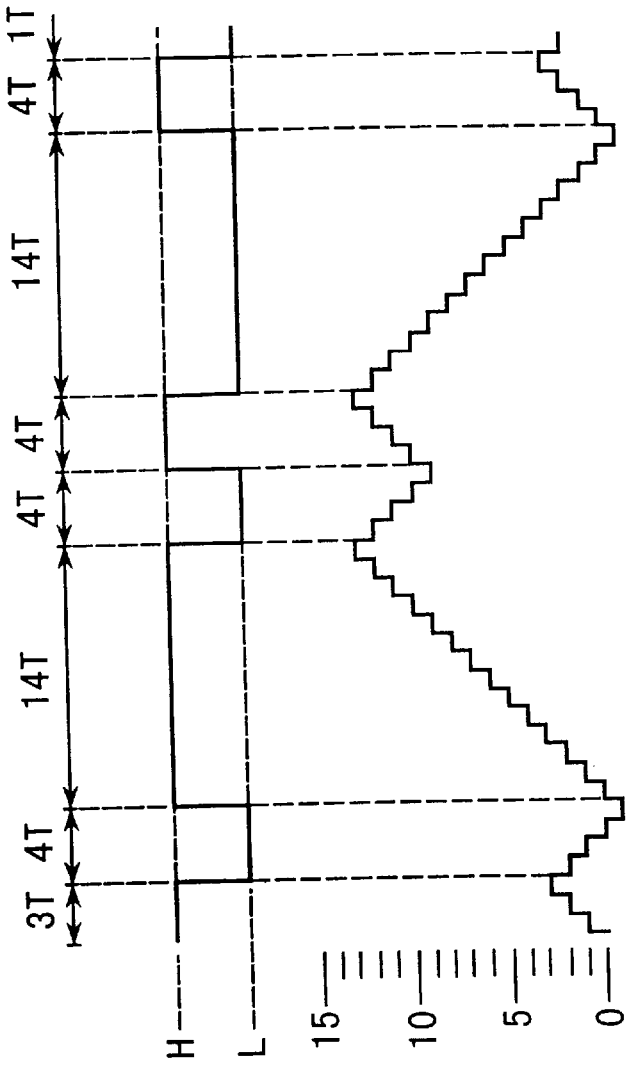
FIG. 7 is a timing chart showing the DSV values of the address mark in FIG. 5.

The DSV of the address mark in FIG. 5 will be described next with reference to FIG. 7. FIG. 7 shows changes in DSV of an address mark formed by repeating an odd pattern, including an odd number of 1s, twice. The polarity of an odd pattern is inverted at the start and end points when NRZI conversion occurs. Referring to FIG. 7, the "odd pattern" is a pattern of 4T-14T-4T, which includes three 1s.

Referring to FIG. 7, high level (H) and low level (L) of the binary waveform respectively correspond to a space and a pit. The lengths of pits and spaces are expressed by channel bit periods T above the binary waveform. The address mark in FIG. 7 is expressed in channel bits as "000100010000000000000100010001000000000000010001". The lower portion of FIG. 7 shows changes in DSV value in units of channel bits of the address mark. Since this address mark is formed by repeating the odd pattern twice, the changes in DVS value exhibit symmetry, and the DSV value ends with a value near 0. When an odd pattern is repeated an even number of times, such a result is obtained by a net effect. If a pattern formed by repeating an odd pattern an even number of times is used as an address mark to suppress DC components, a binarization circuit can be implemented by a simple arrangement.

Address mark patterns in the present invention will be described in more detail below. The pattern shown in FIG. 5 is only an example of a special pattern in the present invention. A special pattern in this embodiment can be expressed as follows.

If a repeated VFO pattern in a VFO field satisfies a run length m, this address mark in the present invention includes a violation pattern satisfying a run length n (n>m, n≠rm+ (r−1), r: natural number). This means that the address mark in the present invention includes a violation pattern "100000000000001". Note that the address mark shown in FIG. 5 satisfies m=3, n=13, and r=3.

This address mark in the present invention includes a special pattern in which a pattern satisfying the run length m is present adjacent to a violation pattern satisfying the run length n. That is, the address mark in the present invention includes a special pattern "10001000000000000010001".

In addition, this address mark in the present invention includes a pattern in which a special pattern including an odd number of 1s repeats itself an even number of times. That is, the address mark in this present invention includes a pattern "00010000000000000100010001000000000000010001" in which a special pattern "0001000000000000010001" repeats itself an even number of times. In other words, the address mark in the present invention includes a pattern in which a special 22-channel-bit pattern having a channel bit "1" appearing at the 4th, 8th, and 22nd channel bits repeats itself an even number of times. That is, the address mark in the present invention includes a pattern "00010000000000000100010001000000000000010001" in which a special pattern "0001000000000000010001" repeats itself an even number of times.

Figure 8:
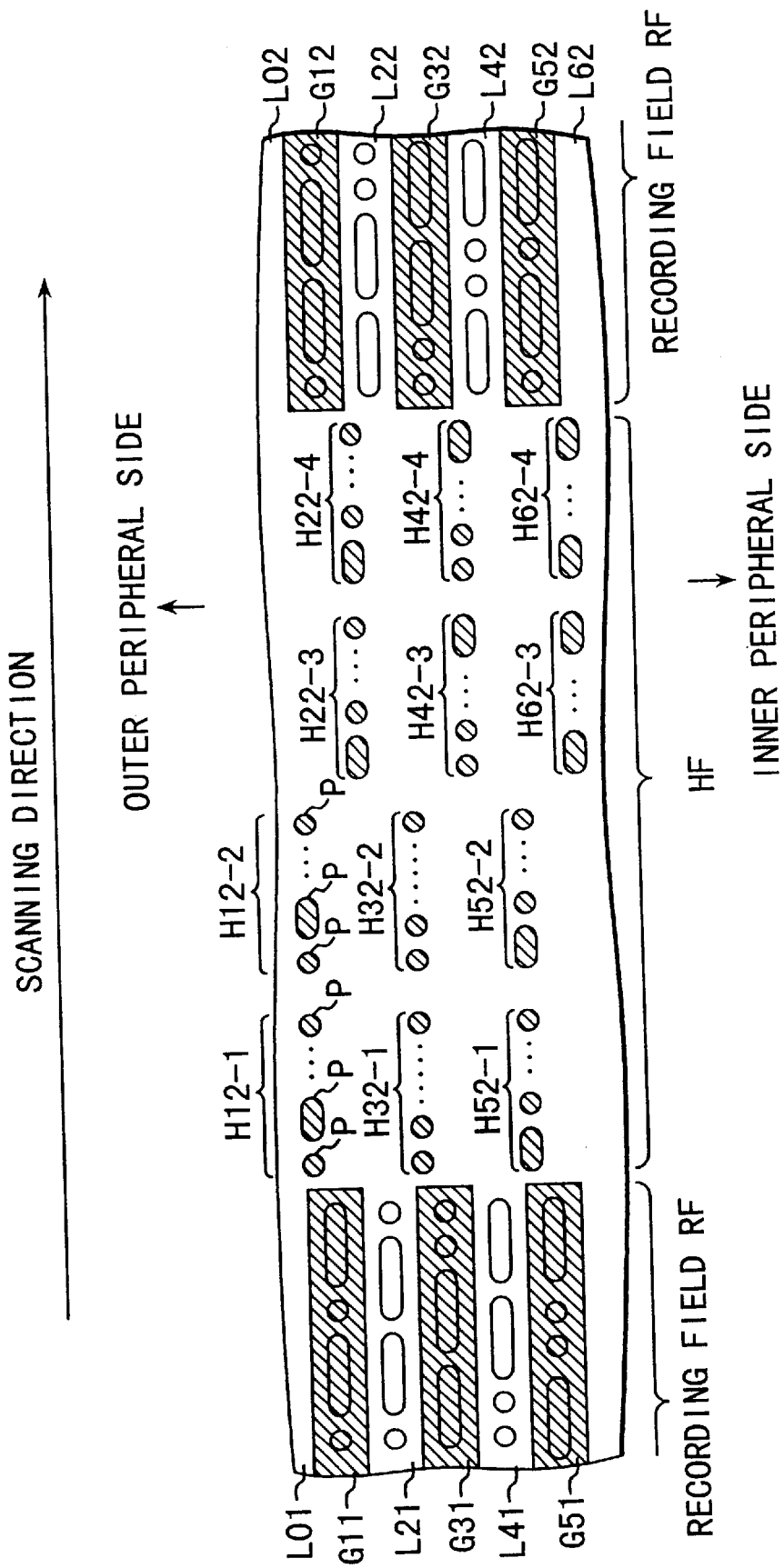
FIG. 8 is a view for explaining the header fields defined between groove sectors or land sectors.
Figure 9:
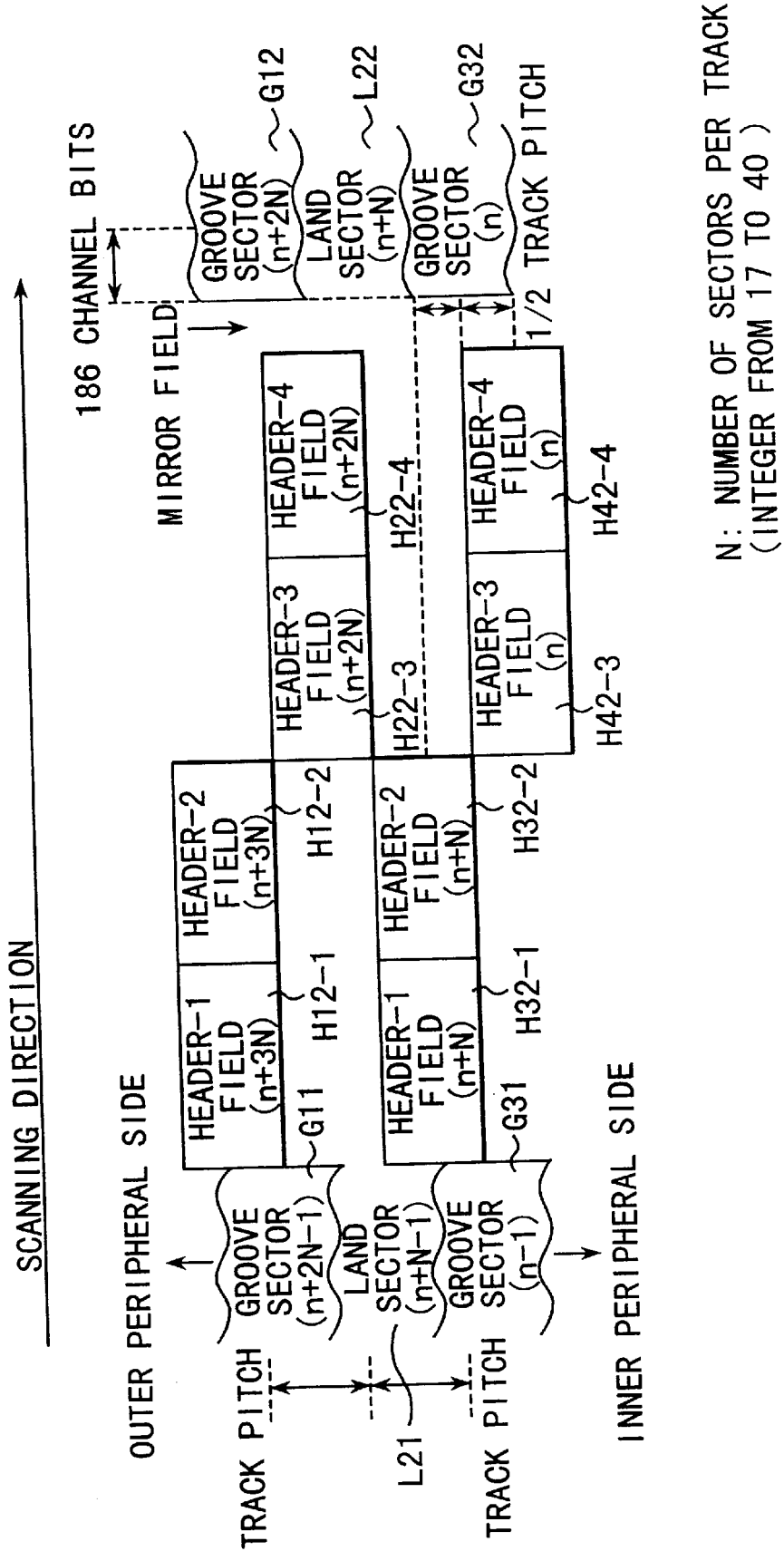
FIG. 9 is a view for explaining the header fields defined between groove sectors or land sectors.
Figure 10:
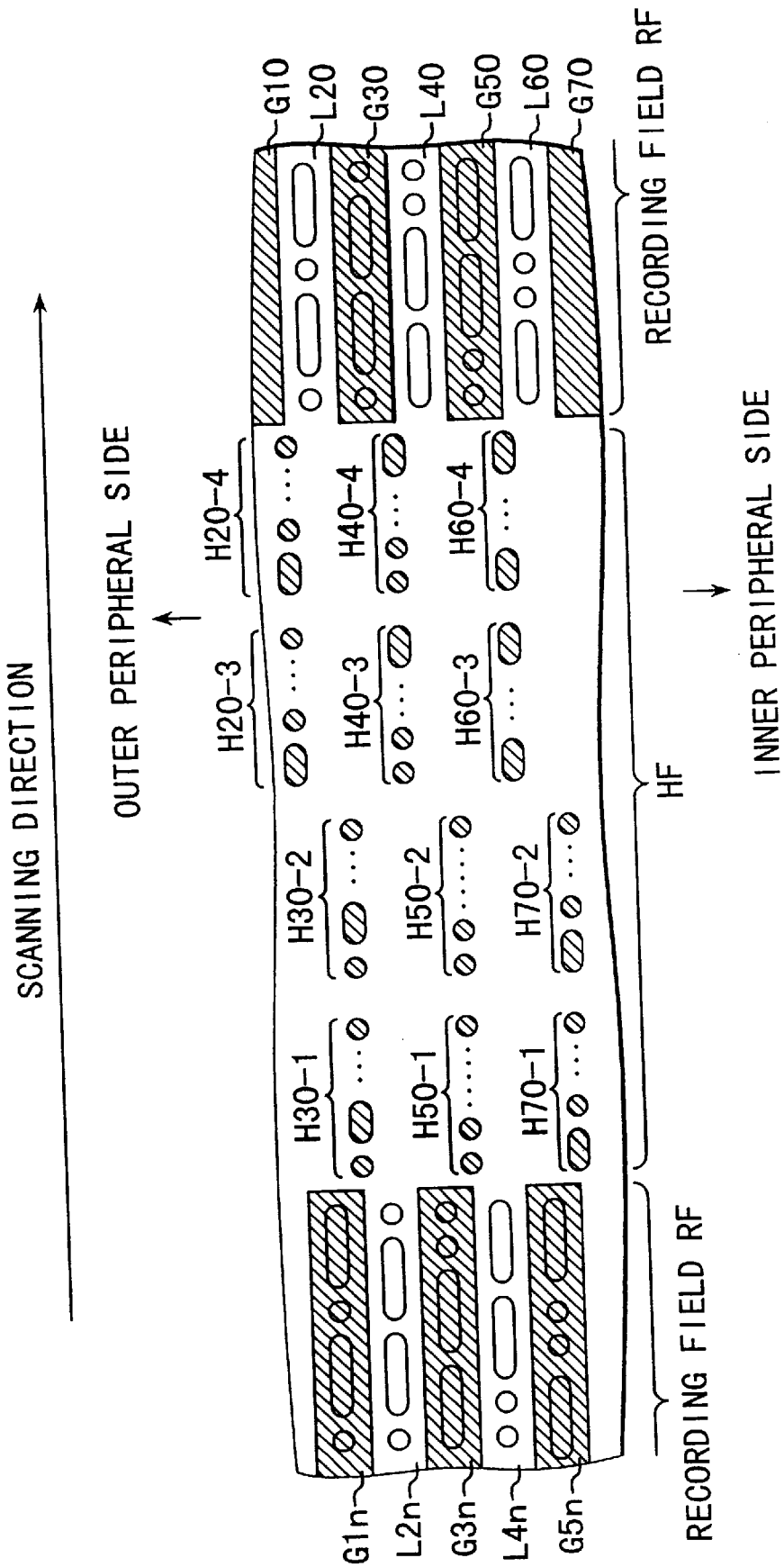
FIG. 10 is a view for explaining the header fields defined between groove and land sectors.
Figure 11:
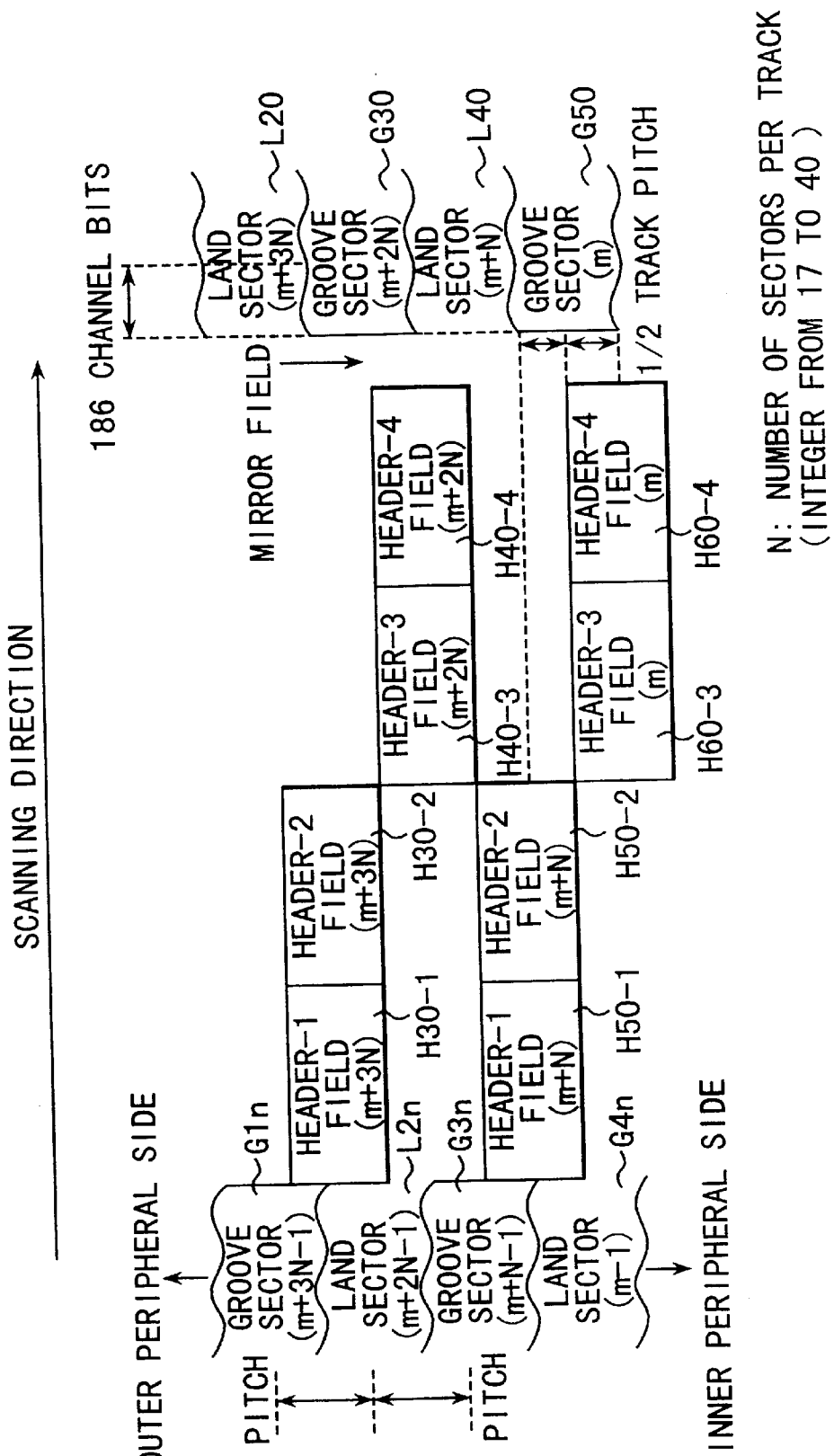
FIG. 11 is a view for explaining the header fields defined between groove and land sectors.

The header fields defined between groove sectors, between land sectors, and between groove and land sectors will be described next with reference to FIGS. 8 to 11. FIGS. 8 and 9 are views for explaining header fields HF between groove sectors or land sectors. FIGS. 10 and 11 are views for explaining header fields HF between groove and land sectors.

FIGS. 8 and 9 show how land sector L01, groove sector G11, land sector L21, groove sector G31, land sector L41, and groove sector G51 are formed on the optical disk from the outer to the inner peripheral side. The distance between the centers of adjacent tracks will be referred to as a track pitch. For example, the distance from the center of the track on which land sector L22 is formed to the center of the track on which groove sector G32 is formed is the track pitch. Referring to FIG. 9, reference symbol N denotes the number of sectors per track (round). The value of N assumes an integer from 17 to 40.

FIGS. 10 and 11 show how groove sector G1n, land sector L2n, groove sector G3n, land sector L4n, and a groove sector G5n are formed on the optical disk from the outer to the inner peripheral side. The distance between the centers of adjacent tracks will be referred to as a track pitch. For example, the distance from the center of the track on which land sector L40 is formed to the center of the track on which groove sector G50 is formed is the track pitch. Referring to FIG. 11, reference symbol N denotes the number of sectors per track (round). The value of N assumes an integer from 17 to 40.

Header fields HF defined between groove sectors or land sectors will be described first with reference to FIGS. 8 and 9.

As shown in FIG. 8, a plurality of pits P are formed in each header field HF. The centers of the pits constituting header 1 field H12-1 and header 2 field H12-2 are located on the extended line of the boundary between land sector L02 and groove sector G12 (or between land sector L01 and groove sector G11). The centers of the pits constituting header 3 field H22-3 and header 4 field H22-4 are located on the extended line of the boundary between groove sector G12 and land sector L22 (or between groove sector G11 and land sector L21). The centers of the pits constituting header 1 field H32-1 and header 2 field H32-2 are located on the extended line of the boundary between land sector L22 and groove sector G32 (or between land sector L21 and groove sector G31). The centers of the pits constituting header 3 field H42-1 and header 4 field H42-4 are located on the extended line of the boundary between groove sector G32 and land sector L42 (or between groove sector G31 and land sector L41). The centers of the pits constituting header 1 field H52-1 and header 2 field H52-2 are located on the extended line of the boundary between land sector L42 and groove sector G52 (or between land sector L41 and groove sector G51). The centers of the pits constituting header 3 field H62-3 and header 4 field H62-4 are located on the extended line of the boundary between groove sector G52 and land sector L62 (or between groove sector G51 and land sector L61).

FIG. 9 shows the relationship between the sector numbers of the headers of header fields HF defined between groove sectors. This relationship will be described below with reference to, for example, the sector numbers of header field HF between groove sector G11 and groove sector G12. Header 1 field H12-1, header 2 field H12-2, header 3 field H22-3, and header 4 field H22-4 are formed between groove sector G11 and groove sector G12. The sector number of header 1 field H12-1 is represented by (n+3N). The sector number of header 2 field H12-2 is represented by (n+3N). The sector number of header 3 field H22-3 is represented by (n+2N). The sector number of header 4 field H22-4 is represented by (n+2N). In other words, the relationship between the sector numbers of the respective headers formed between the groove sectors can be expressed as (sector number of header 1 field or header 2 field)>(sector number of header 3 field or header 4 field).

FIG. 9 shows the relationship between the sector numbers of the headers of header fields HF arranged between land sectors. This relationship will be described below with reference to, for example, the sector numbers of the respective headers arranged between land sector L21 and land sector L22. Header 1 field H32-1, header 2 field H32-2, header 3 field H22-3, and header 4 field H22-4 are formed between land sector L21 and land sector L22. The sector number of header 1 field H32-1 is represented by (n+N). The sector number of header 2 field H32-2 is represented by (n+N). The sector number of header 3 field H22-3 is represented by (n+2N). The sector number of header 4 field H22-4 is represented by (n+2N). More accurately, the relationship between the sector numbers of the respective heads arranged between the land sectors can be expressed as (sector number of header 1 field or header 2 field)<(sector number of header 3 field or header 4 field).

If, therefore, it is determined upon reproduction of headers that "(sector number of header 1 field or header 2 field)>(sector number of header 3 field or header 4 field) holds, the sector (track) after these headers is identified as a groove sector (groove track), and reproduction processing corresponding to the groove sector can be performed. In contrast to this, if, therefore, it is determined upon reproduction of headers that "(sector number of header 1 field or header 2 field)<(sector number of header 3 field or header 4 field) holds, the sector (track) after these headers is identified as a land sector (land track), and reproduction processing corresponding to the land sector can be performed.

Header fields HF defined between groove and land sectors, i.e., header fields HF formed on the transitional portions between groove and land sectors, will be described next with reference to FIGS. 10 and 11.

As shown in FIG. 10, a plurality of pits P are formed in header fields HF. The centers of the pits constituting header 3 field H20-3 and header 4 field H20-4 are located on the extended line of the boundary between groove sector G10 and land sector L20. The centers of the pits constituting header 1 field H30-1 and header 2 field H30-2 are located on the extended line of the boundary between land sector L20 and groove sector G30 (or between groove sector G1n and land sector L2n). The centers of the pits constituting header 3 field H40-3 and header 4 field H40-4 are located on the extended line of the boundary between groove sector G30 and land sector L40 (or between land sector L2n and groove sector G3n). The centers of the pits constituting header 1 field H50-1 and header 2 field H50-2 are located on the extended line of the boundary between land sector L40 and groove sector G50 (or between groove sector G3n and land sector L4n). The centers of the pits constituting header 3 field H60-3 and header 4 field H60-4 are located on the extended line of the boundary between groove sector G50 and land sector L60 (or between land sector L4n and groove sector G5n). The centers of the pits constituting header 1 field H70-1 and header 2 field H70-2 are located on the extended line of the boundary between land sector L60 and groove sector G70.

FIG. 11 shows the relationship between the sector numbers of the heads of header fields HF defined between the land and groove sectors (transition from a land sector to a groove sector). This relationship will be described below with reference to, for example, the sector numbers of the respective headers arranged between land sector L2n and groove sector G30. Header 1 field H30-1, header 2 field H30-2, header 3 field H40-3, and header 4 field H40-4 are formed between land sector L2n and groove sector G30. The sector number of header 1 field H30-1 is represented by (m+3N). The sector number of header 2 field H30-2 is represented by (m+3N). The sector number of header 3 field H40-3 is represented by (m+2N). The sector number of header 4 field H40-4 is represented by (m+2N). This means that the relationship between the sector numbers of the respective headers between the land and groove sectors can be expressed as (sector number of header 1 field or header 2 field)>(sector number of header 3 field or header 4 field).

FIG. 11 shows the relationship between the sector numbers of the headers of header fields HF defined between groove and land sectors (transition from a groove sector to a land sector). This relationship will be described below with reference to, for example, the sector numbers of the respective headers arranged between groove sector G3n and land sector L40. Header 1 field H50-1, header 2 field H50-2, header 3 field H40-3, and header 4 field H40-4 are formed between groove sector G3n and land sector L40. The sector number of header 1 field H50-1 is represented by (m+N). The sector number of header 2 field H50-2 is represented by (m+N). The sector number of header 3 field H40-3 is represented by (m+2N). The sector number of header 4 field H40-4 is represented by (m+2N). In other words, the relationship between the sector numbers of the respective headers arranged between the groove and land sectors can be expressed as (sector number of header 1 field or header 2 field)<(sector number of header 3 field or header 4 field).

If, therefore, it is determined upon reproduction of headers that "(sector number of header 1 field or header 2 field)>(sector number of header 3 field or header 4 field) holds, the sector (track) after these headers is identified as a groove sector (groove track), and reproduction processing corresponding to the groove sector can be performed. In contrast to this, if it is determined upon reproduction of headers that "(sector number of header 1 field or header 2 field)<(sector number of header 3 field or header 4 field) holds, the sector (track) after these headers is identified as a land sector (land track), and reproduction processing corresponding to the land sector is performed.

As described above with reference to FIGS. 8 to 11, a sector (track) after given headers can be identified as a land sector (land track) or a groove sector (groove track) on the basis of the relationship in magnitude between the header 1 field (or header 2 field) and the header 3 field (or header 4 field) obtained upon reproduction of the headers.

The positional relationship between groove and land sectors (groove and land tracks) and header fields HF will be described below.

A scheme of switching the positions of groove and land tracks in units of revolutions is called a single spiral scheme. In an optical disk using such a single spiral scheme, if header fields are recorded between land and groove tracks as described above, cutting can be realized by one beam. The sector located between groove and land tracks will be referred to as a fast sector. FIGS. 10 and 11 show the header fields of the fast sectors. Referring to FIGS. 8 to 11, the polarities of the spiral tracks are switched as the tracks are switched between land and groove tracks.

In the single spiral scheme in which the positions of groove and land tracks are switched in this manner in units of revolutions, the polarities of groove and land tracks must be switched in tracking. For this reason, the arrangement of headers in a sector at transition from a groove track to a land track or from a land track to a groove track differs from that of headers in other sectors.

A method of manufacturing an optical disk will be described next. First of all, a glass disk is manufactured. This glass disk is coated with a photoresist (photosensitive resin) to form a photoresist disk. This photoresist disk is rotated, and a laser beam is irradiated on the rotated photoresist disk. Tracks and header data are recorded on the photoresist disk by exposure. When the photoresist disk on which the tracks and the headers are recorded by exposure is developed, the photoresist portions corresponding to the exposed portions dissolve in a developing solution. As a result, tracks and header data are formed on the photoresist disk.

This process of forming the tracks and the header data on the photoresist disk is called a cutting process. This cutting processing is implemented by a cutting apparatus. For example, this cutting apparatus includes an optical head for irradiating a laser beam on a photoresist disk. A metal is deposited on the photoresist disk on which the tracks and the headers are formed to manufacture a master. This master is plated with Ni, and the Ni-plated layer is peeled off from this master. The peeled Ni-plated layer becomes a mold called a stamper for an optical disk. An optical disk is manufactured by using this stamper as a mold.

In the above cutting process, the optical head of the cutting apparatus is moved by the track pitch toward the outer peripheral side at a uniform velocity per revolution of the disk. The portions which are irradiated with a laser beam become grooves, and the portions which are not irradiated with the laser beam become lands.

FIG. 11 shows the fast sectors of three tracks with sector numbers m, (m+N), and (m+2N). In a cutting process, after land sector L4n is formed, a laser beam is shifted from the center of the track corresponding to land sector L4n to the outer peripheral side by half the track pitch to record header 1 field H50-1 and header 2 field H50-2. The laser beam is further shifted from the center of the track corresponding to land sector L4n to the inner peripheral side by half the track pitch to record header 1 field H50-3 and header 2 field H50-4.

A mirror portion is formed by not irradiating a laser beam. A groove portion is formed by irradiating a laser beam. In this case, wavy grooves are formed by oscillating the spot of a laser beam sinusoidally at a channel bit period of 186 from the inner to the outer peripheral side. This signal component is used as a reference signal for the generation of a clock for a data write. In the process of one revolution from sector number m to sector number (m+N−1), recording is performed according to the above procedure. In the process of one revolution from sector number (m+N) to sector number (m+2N−1), no laser beam is irradiated. This operation is repeated to form header fields like those shown in FIG. 11.

FIGS. 8 and 9 show the header structure of a sector other than a fast sector. With the cutting process described above, a pair of header 1 field and header 2 field as the first-half headers of a groove sector, and a pair of header 3 field and header 4 field as the second-half headers of the groove sector are recorded. Note that the first-half headers of a land sector are recorded one revolution before the second-half headers are recorded.

Figure 12:
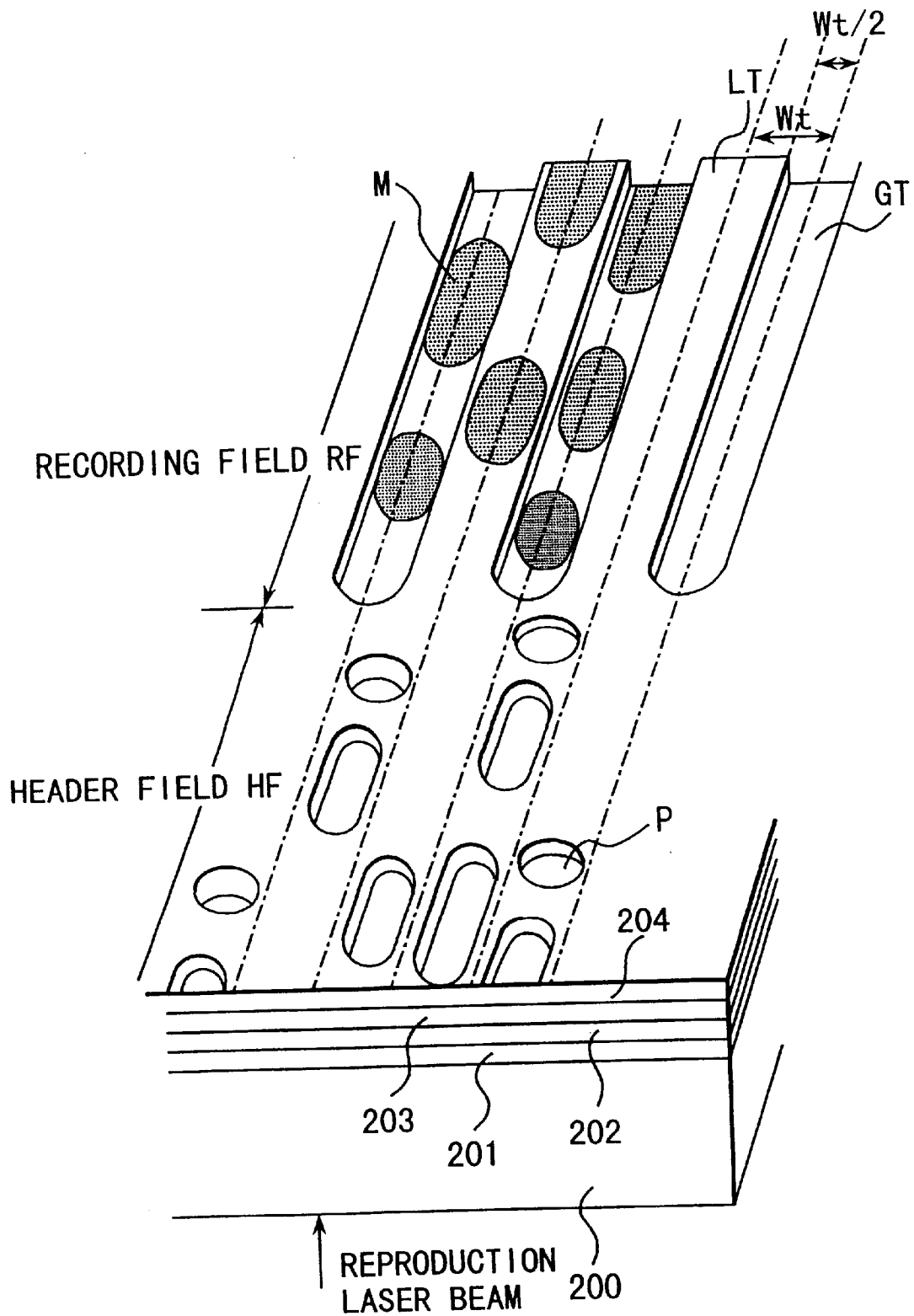
FIG. 12 is a sectional view of an optical disk, schematically showing the structure of the optical disk.

The structure of an optical disk will be described next with reference to FIG. 12.

An optical disk substrate 200 is made of a transparent material such as a plastic material and is replicated from a mold called a stamper. Header fields HF and recording fields RF are recorded on the substrate 200. Header data is recorded in each header field HF by forming embossed pits P. Groove tracks GT and land tracks LT are formed in recording fields RF.

Each embossed pit P has a convex shape, each groove track GT has a convex shape, and each land track LT has a concave shape when viewed from the incident side of a reproduction laser beam. A protective film 201, a recording film 202, a protective film 203, and a reflecting film 204 are sequentially stacked on the uneven recording surface of the substrate 200 in the order named. Each chain line in FIG. 12 indicates the center of groove track GT or land track LT. Embossed pits P constituting a header fields are located on a line shifted from the center lines of groove track GT and land track LT by Wt/2. In this case, Wt represents a track pitch, which is the distance between the centers of groove track GT and land track LT.

Embossed pits P are formed in a staggered pattern by causing a laser spot to wobble by Wt/2 in a cutting process for groove track GT.

As shown in FIGS. 9 and 11, the formation of embossed pits P in a staggered pattern in header field HF obviates the need for making the width of groove track GT different from the diameter of embossed pit P. That is, groove tracks GT and embossed pits P can be cut by the same beam. The cutting apparatus can therefore be greatly simplified.

Figure 13:
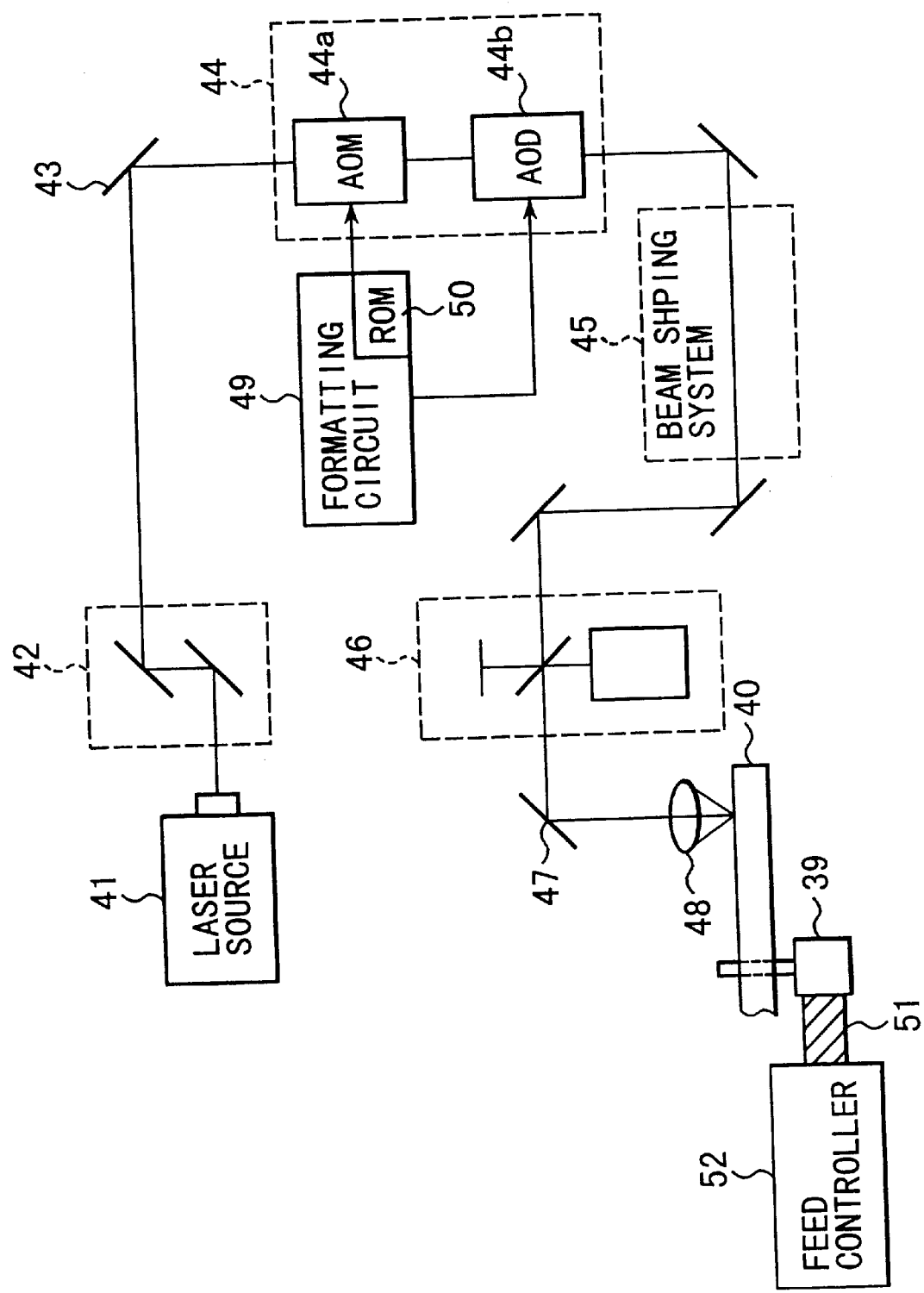
FIG. 13 is a block diagram showing the schematic arrangement of a cutting apparatus.
Figure 14:
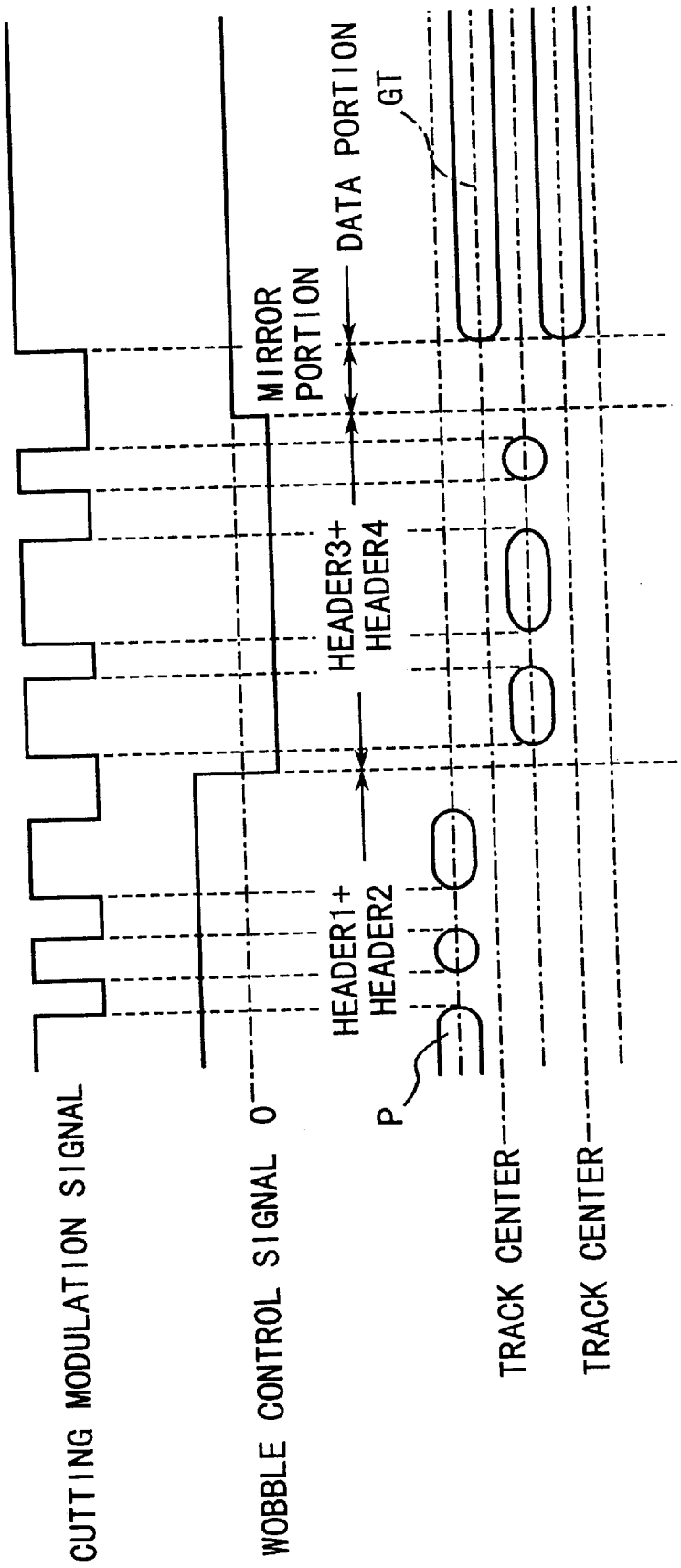
FIG. 14 is a view for explaining a cutting modulation signal and a wobble control signal generated by the formatting circuit of the cutting apparatus.
Figure 15:
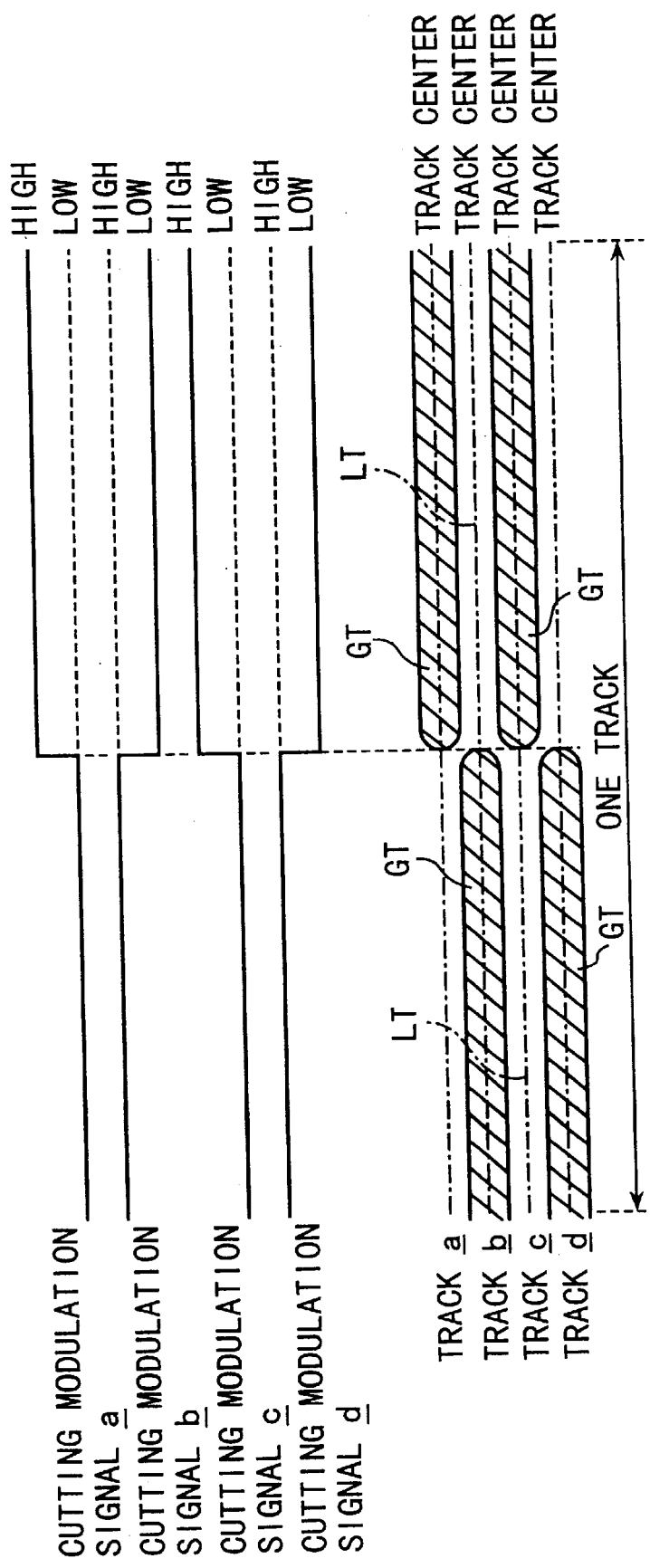
FIG. 15 is a view for explaining cutting modulation signals for forming a single spiral structure.

The cutting apparatus will be described next with reference to FIGS. 13 to 15. Header data including a repeated VFO pattern, the address mark and address data shown in FIG. 5, and the like is recorded at a predetermined position by exposure using this cutting apparatus. FIG. 13 shows the schematic arrangement of the cutting apparatus. FIG. 14 is a view for explaining a cutting modulation signal and a wobble control signal generated by the formatting circuit of the cutting apparatus. FIG. 15 is a view for explaining cutting modulation signals for forming a single spiral structure.

The schematic arrangement of the cutting apparatus will be described first with reference to FIG. 13. A laser beam (Ar or Kr laser beam) emitted by a laser source 41 is incident on a laser beam optical axis control system 42 for adjusting the optical axis. The laser beam optical axis control system 42 adjusts the optical axis of the laser beam. The laser beam adjusted by the laser beam optical axis control system 42 is reflected by a mirror 43 to enter a beam modulation system 44 controlled by a formatting circuit 49.

The beam modulation system 44 is constituted by an acousto-optical modulator (AOM) 44a and an acousto-optical deflector (AOD) 44b. The acousto-optical modulator 44a modulates the laser beam in accordance with a cutting modulation signal supplied from the formatting circuit 49. The acousto-optical deflector 44b deflects the laser beam in accordance with an instruction supplied from the formatting circuit 49. More specifically, the header data including the repeated VFO pattern, the address mark and address data shown in FIG. 5, and the like is reflected in the laser beam by the beam modulation system 44. As a result, the header data including the repeated VFO pattern, the address mark and address data shown in FIG. 5, and the like is recorded on the master by exposure. The formatting circuit 49 includes a ROM 50 and serves to generate a cutting signal for determining the laser output and exposure position and a wobble control signal indicating the wobble amount and wobble direction. The ROM 50 will be described in detail later.

The incoming laser beam on the beam modulation system 44 is modulated by the acousto-optical modulator 44a and deflected by the acousto-optical deflector 44b. The laser beam modulated by the beam modulation system 44 reaches a beam shaping system 45 constituted by pin holes and slits. The diameter and shape of the laser beam are adjusted by the beam shaping system 45. The laser beam adjusted by the beam shaping system 45 is sent onto a beam monitor system 46. The beam monitor system 46 monitors the shape of the laser beam.

The laser beam monitored by the beam monitor system 46 is guided to a mirror 47 and focused and irradiated onto a photoresist disk 40 through an objective lens 48. The photoresist disk 40 is obtained by coating a glass disk with a photoresist. The portions, of the photoresist disk 40, on which the laser beam is irradiated become concave portions upon etching.

In a cutting process, the photoresist disk 40 is rotated at a uniform velocity by a spindle motor 39. The photoresist disk 40 is also moved in a predetermined direction, together with the spindle motor 39, by a feed screw 51. With this movement, the laser irradiated through the objective lens 48 is moved from the inner to the outer peripheral side of the photoresist disk 40. The feed screw 51 moves the photoresist disk 40 together with the spindle motor 39 under the control of a feed controller 52. The laser beam is moved from the inner to the outer peripheral side by the track pitch per revolution of the photoresist disk 40 under the control of the feed controller 52. A portion which is irradiated with the laser beam moved in this manner becomes a groove track, and a portion which is not irradiated with the laser beam becomes a land track. By flickering the laser beam, header data constituting header field HF is recorded.

A ROM 50 in the formatting circuit 49 will be described below. A conversion table for implementing 8-16 modulation is stored in the ROM 50. This conversion table is used to modulate an 8-bit input code sequence (to be referred to as source data hereinafter) into a 16-bit output code sequence (to be referred to a converted code hereinafter). A cutting modulation signal is generated on the basis of a converted code obtained by this conversion table.

The cutting modulation signal and wobble control signal generated by the formatting circuit 49 will be described next with reference to FIG. 14.

The cutting modulation signal is a signal used as a modulation signal for the laser source 41 of the cutting apparatus. Assume that in FIG. 14, the level of the cutting modulation signal is proportional to the output of a laser beam.

The wobble control signal is a signal for controlling the deflection angle in the acousto-optical deflector 44*b* to shift the position of a beam. When the level of the wobble control signal is higher than zero level, the irradiation position of the beam moves upward from the center position of a track. When the level of the wobble control signal is smaller than zero level, the irradiation position of the beam moves downward from the center position of a track.

As shown in FIG. 14, portions where the level of the wobble control signal is higher than zero level, i.e., header 1 field and header 2 field portions, are shifted upward from the center position of a track, whereas portions where the level of the wobble signal is lower than zero level, i.e., header 3 field and header 4 field portions, are shifted downward from the center position of the track. A portion where the level of the wobble control signal coincides with zero level, i.e., a groove portion, is formed at the center position of the track.

When the cutting modulation signal is set at high level, a concave portion is formed on the master. Hence, when the cutting modulation signal is set at high level, an embossed pit is formed.

Cutting modulation signals for forming a single spiral structure will be described next with reference to FIG. 15.

Each of cutting modulation signals a to d is a signal corresponding to one track.

When the cutting modulation signal a is set at low level, land track LT forming a track a is formed. When the cutting modulation signal a is set at high level, groove track GT forming the track a is formed.

When the cutting modulation signal b is set at low level, land track LT forming a track b is formed. When the cutting modulation signal b is set at high level, groove track GT forming the track b is formed.

When the cutting modulation signal c is set at low level, land track LT forming a track c is formed. When the cutting modulation signal c is set at high level, groove track GT forming the track c is formed.

When the cutting modulation signal d is set at low level, land track LT forming a track d is formed. When the cutting modulation signal d is set at high level, groove track GT forming the track d is formed.

Every time the photoresist disk makes one revolution, the cutting modulation signals are switched between the cutting modulation signals a, b, c, and d. With this operation, a single spiral structure is realized.

Figure 17:
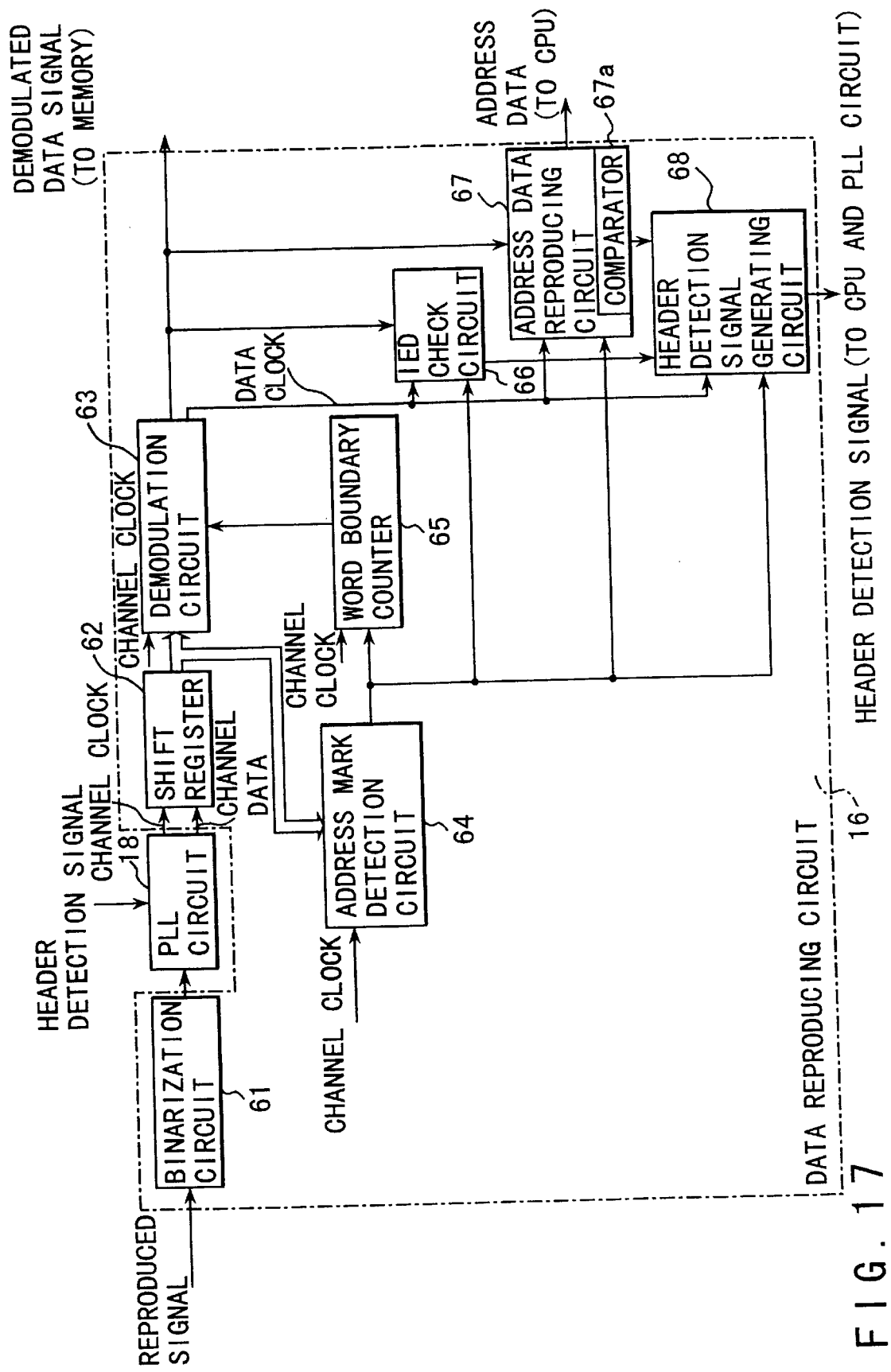
FIG. 17 is a block diagram showing the schematic arrangement of the data reproducing circuit of the optical disk apparatus in FIG. 16.

An optical disk apparatus as an information reproducing apparatus will be described next with reference to FIGS. 16 and 17. The optical disk apparatus to be described below is designed to record/reproduce data on/from an optical disk on which header data including the address mark shown in FIG. 5 is recorded. FIG. 16 shows the schematic arrangement of the optical disk apparatus. FIG. 17 shows the schematic arrangement of the data reproducing circuit of the optical disk apparatus.

The schematic arrangement of the optical disk apparatus will be described first with reference to FIG. 16.

In this optical disk apparatus, a convergent light beam is irradiated on an optical disk 1, and the light beam reflected by the optical disk 1 is received, thereby reproducing data recorded on the optical disk 1 and reflected in the received reflected light beam. In addition, the optical disk apparatus irradiates a light beam on the optical disk 1 to record data on the optical disk 1.

The optical disk 1 is rotated by a motor 3 at different numbers of revolutions in units of zones of the optical disk. This motor 3 is controlled by a motor control circuit 4. Data is recorded/reproduced on/from the optical disk 1 by an optical head 5. The optical head 5 is fixed to a driving coil 7 as a constituent of the movable portion of a linear motor 6. The driving coil 7 is connected to a linear motor control circuit 8.

A speed detector 9 is connected to the linear motor control circuit 8. A speed signal indicating the speed of the optical head 5 and detected by the speed detector 9 is sent to the linear motor control circuit 8. A permanent magnet (not shown) is mounted on the fixed portion of the linear motor 6. When the driving coil 7 is energized by the linear motor control circuit 8, the optical head 5 is radially moved along the optical disk 1.

The optical head 5 has an objective lens 10 supported on a wire or leaf spring (not shown). The objective lens 10 can be moved in the focusing direction (along the optical axis of the lens) by a driving coil 11. The objective lens 10 can also be moved in the tracking direction (a direction perpendicular to the optical axis of the lens) by a driving coil 12.

A laser beam is emitted by a semiconductor laser oscillator 19 under the control of a laser control circuit 13. The laser control circuit 13 is constituted by a modulation circuit 14 and a laser driving circuit 15 and operates in synchronism with a recording clock signal supplied from a PLL circuit 18. The modulation circuit 14 modulates record data supplied from an error correction circuit 32 into a signal suitable for recording, i.e., 8-16 modulated data. The laser driving circuit 15 drives the semiconductor laser oscillator (or argon/neon laser oscillator 19) in accordance with the 8-16 modulated data from the modulation circuit 14.

The PLL circuit 18 generates a recording clock by frequency-dividing a fundamental block signal generated by a quartz oscillator 17. The fundamental clock signal is frequency-divided by a frequency division value set by a CPU 30. Alternatively, the fundamental clock signal is frequency-divided into a frequency corresponding to the time intervals at which header fields HF are reproduced. In the reproduction mode, the PLL circuit 18 generates a reproduction clock signal corresponding to a reproduced sync code. In addition, the PLL circuit 18 selectively outputs a recording or reproduction clock signal in accordance with a control signal from the CPU 30 and a signal from a binarization circuit 61 of a data reproducing circuit 16.

A laser beam emitted by the semiconductor laser oscillator 19 is irradiated on the optical disk 1 through a collimator lens 20, a half prism 21, and the objective lens 10. The light reflected by the optical disk 1 is guided to a photodetector 24 through the objective lens 10, the half prism 21, a focusing lens 22, and a cylindrical lens 23.

The photodetector 24 is made up of four photodetection cells 24*a*, 24*b*, 24*c*, and 24*d*. An output signal from the photodetection cell 24*a* is supplied to one terminal of an adder 26*a* through an amplifier 25*a*. An output signal from the photodetection cell 24*b* is supplied to one terminal of an adder 26*b* through an amplifier 25*b*. An output signal from the photodetection cell 24*c* is supplied to the other terminal of the adder 26*a* through an amplifier 25*c*. An output signal from the photodetection cell 24*d* is supplied to the other terminal of an adder 26*d* through an amplifier 25*d*.

The output signal from the photodetection cell 24a is supplied to one terminal of the adder 26c through the amplifier 25a. The output signal from the photodetection cell 24b is supplied to one terminal of the adder 26c through the amplifier 25b. The output signal from the photodetection cell 24c is supplied to the other terminal of the adder 26d through the amplifier 25c. The output signal from the photodetection cell 24d is supplied to the other terminal of the adder 26b through the amplifier 25d.

An output signal from the adder 26a is supplied to the inverting input terminal of a differential amplifier OP2, and an output signal from the adder 26b is supplied to the non-inverting input terminal of the differential amplifier OP2. The differential amplifier OP2 outputs a signal concerning the focus point and corresponding to the difference between the output signals from the adders 26a and 26b. This output is supplied to a focusing control circuit 27. An output signal from the focusing control circuit 27 is supplied to the driving coil 12. With this operation, a laser beam is always controlled in a just focused state on the optical disk 1.

An output signal from the adder 26c is supplied to the inverting input terminal of a differential amplifier OP1, and an output signal from the adder 26d is supplied to the non-inverting input terminal of the differential amplifier OP1. The differential amplifier OP1 outputs a track difference signal corresponding to the difference between the two output signals from the adders 26c and 26d. This output is supplied to a tracking control circuit 28. The tracking control circuit 28 generates a track driving signal in accordance with the track difference signal from the differential amplifier OP1.

The track driving signal output from the tracking control circuit 28 is supplied to the driving coil 11 in the tracking direction. The track difference signal used in the tracking control circuit 28 is supplied to the linear motor control circuit 8.

With the above focusing and tracking operations, the sum signal of the output signals from the photodetection cells 24a, 24b, 24c, and 24d of the photodetector 24, i.e., an output signal from an adder 26e which is obtained by adding the two output signals from the adders 26c and 26d, reflects changes in reflectance due to the data recorded on the optical disk 1. The output signal from the adder 26e is supplied to the data reproducing circuit 16.

The data reproducing circuit 16 reproduces the data reflected in the output signal from the adder 26e and recorded on the optical disk. The reproduced data reproduced by the data reproducing circuit 16 is subjected to error correction in the error correction circuit 32. The resultant data is output to an optical disk controller 36 through an interface circuit 35. In addition, the record data output from the optical disk controller 36 is supplied to the error correction circuit 32 through the interface circuit 35 and a bus 29.

While the objective lens 10 is moved by the tracking control circuit 28, the optical head 5 is moved by the linear motor control circuit 8 such that the objective lens 10 is located near the center position of the optical head 5.

A D/A converter 31 is used to exchange data between the focusing control circuit 27, the tracking control circuit 28, the linear motor control circuit 8, and the CPU 30.

The motor control circuit 4, the linear motor control circuit 8, the laser driving circuit 15, the PLL circuit 18, the data reproducing circuit 16, the focusing control circuit 27, the tracking control circuit 28, the error correction circuit 32, and the like are controlled by the CPU 30 through the bus 29. The CPU 30 performs predetermined operations in accordance with the programs recorded on the lead-in area 2.

The data reproducing circuit 16 will be described in detail next with reference to FIG. 17.

As shown in FIG. 17, the data reproducing circuit 16 is constituted by a binarization circuit 61, a shift register 62, a demodulation circuit 63, an address mark detection circuit 64 as an address mark detection means, a word boundary counter 65, an IED check circuit 66, an address data reproducing circuit 67, and a header detection signal generating circuit 68.

The binarization circuit 61 binarizes an addition signal supplied from the adder 26e. The binary signal from the binarization circuit 61 is supplied to the PLL circuit 18 to be converted into a data sequence (channel data) synchronized with a reproduction clock signal (channel clock).

Channel clock and channel data as output signals from the PLL circuit 18 are supplied to the 16-bit shift register 62. This channel clock is also supplied to the demodulation circuit 63, the address mark detection circuit 64, and the word boundary counter 65.

The shift register 62 converts the channel data supplied from the PLL circuit 18 into 16-bit parallel data, and outputs the parallel data. The 16-bit channel data output from the shift register 62 is supplied to the demodulation circuit 63 and the address mark detection circuit 64.

The demodulation circuit 63 includes a demodulation ROM and a parallel/serial conversion section (neither of which are shown). Data about 8-16 modulation is stored in the demodulation ROM. The 16-bit channel data supplied from the shift register 62 is demodulated into 8-bit data on the basis of the data about 8-16 modulation stored in the demodulation ROM. In the demodulation mode, the word boundary signal supplied from the word boundary counter 65 is used. In addition, the demodulation circuit 63 frequency-divides the channel clock supplied from the PLL circuit 18 to generate a data clock. The parallel/serial conversion section converts the demodulated 8-bit data into serial data in accordance with the data clock.

The serial data supplied from the demodulation circuit 63 is output to the IED check circuit 66 and the address data reproducing circuit 67. The data clock generated by the demodulation circuit 63 is output to the IED check circuit 66, the address data reproducing circuit 67, and the header detection signal generating circuit 68.

The address mark detection circuit 64 includes a ROM and a comparator (neither of which are shown). The address mark (channel bit data) shown in FIG. 5 is stored in the ROM. The comparator compares the channel bit data supplied from the shift register 62 with the address mark stored in the ROM. If the comparison result obtained by the comparator indicates that the channel bit data supplied from the shift register 62 coincides with the address mark stored in the ROM, the address mark detection circuit 64 outputs an address mark detection signal. The address mark detection signal output from the address mark detection circuit 64 is supplied to the word boundary counter 65, the IED check circuit 66, the address data reproducing circuit 67, and the header detection signal generating circuit 68.

As described above, the address mark stored in the ROM of the address mark detection circuit 64 includes a special pattern which does not appear in any patterns reproduced from other fields. The use of the address mark shown in FIG. 5 therefore prevents a detection error of an address mark.

The word boundary counter 65 starts counting in response to the address mark detection signal supplied from the address mark detection circuit 64 as a trigger, and outputs a word boundary signal in units of fixed-length block codes (16 channel bits). The word boundary signal from the word boundary counter 65 is output to the demodulation circuit 63.

The IED check circuit 66 receives the address mark detection signal supplied from the address mark detection circuit 64. At this time, the IED check circuit 66 receives the PID data recorded in the PIDn field (n: 1 to 4) and the error detection code recorded in the IEDn field (n: 1 to 4) on the basis of the data clock supplied from the demodulation circuit. The IED check circuit 66 then checks the PID data on the basis of the error detection code. The check result obtained by the IED check circuit 66 is output to the header detection signal generating circuit 68.

The address data reproducing circuit 67 reproduces the address data recorded in the PID field on the basis of the address mark detection signal supplied from the address mark detection circuit 64. The address mark is data indicating the recording position of the address data. Correct address data can therefore be reproduced by reproducing address data on the basis of the address mark detection signal. The address data reproduced by the address data reproducing circuit 67 is output to the CPU 30.

The address data reproducing circuit 67 has a comparator 67a. The comparator 67a has a ROM. In this ROM, "00" representing PID1, "01" representing PID2, "10" representing PID3, and "11" representing PID4 are stored. The comparator 67a receives the address mark detection signal supplied from the address mark detection circuit 64. At this time, the comparator 67a receives the PID data recorded in the PIDn field (n: 1 to 4) on the basis of the data clock supplied from the demodulation circuit. The comparator 67a compares the PID numbers (00, 01, 10, and 11) included in the PID data with the data (PID1=00, PID2=01, PID3=10, and PID4=11) stored in the ROM to identify PID1, PID2, PID3, and PID4. This identification result is supplied from the comparator 67a to the header detection signal generating circuit 68.

The header detection signal generating circuit 68 outputs a header detection signal on the basis of the check result supplied from the IED check circuit 66, the identification result supplied from the comparator 67a, the address mark detection signal supplied from the address mark detection circuit 64, and the data clock supplied from the demodulation circuit 63. The header detection signal output from the header detection signal generating circuit 68 is supplied to the PLL circuit 18 and the CPU 30.

If, for example, a check result indicating the absence of an error and an identification result indicating PID1 are supplied to the header detection signal generating circuit 68, the header detection signal generating circuit 68 generates a header detection signal 94 bytes after the address mark detection signal is supplied.

If a check resulting indicating the absence of an error and an identification result indicating PID2 are supplied to the header detection signal generating circuit 68, the header detection signal generating circuit 68 generates a header detection signal 76 bytes after the address mark detection signal is supplied.

If a check resulting indicating the absence of an error and an identification result indicating PID3 are supplied to the header detection signal generating circuit 68, the header detection signal generating circuit 68 generates a header detection signal 30 bytes after the address mark detection signal is supplied.

If a check resulting indicating the absence of an error and an identification result indicating PID4 are supplied to the header detection signal generating circuit 68, the header detection signal generating circuit 68 generates a header detection signal 12 bytes after the address mark detection signal is supplied.

To recapitulate, according to the present invention, the following information recording medium, cutting apparatus, and information reproducing apparatus can be provided:

(1) an information recording medium on which an address mark which can be normally detected even if a defective pit is included in a VFO field is recorded;

(2) a cutting apparatus for recording by exposure an address mark which can be normally detected even if a defective pit is included in a VFO field on a master for an information recording medium; and (3) an information reproducing apparatus for reproducing address data in accordance with an address mark which can be normally detected even if a defective pit is included in a VFO field.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording medium comprising a plurality of sector fields and having various pieces of information recorded in the sector fields, wherein the sector field comprises:
a header field in which (i) a continuously repeated pattern, (ii) an address mark comprising a violation pattern exceeding a run length limitation in a predetermined range and (iii) address data complying with the run length limitation in the predetermined range, a recording position of which is indicated by the address mark, are recorded; and
a recording field on/from which data is recorded/reproduced on the basis of data recorded in the header field, wherein
the address mark is 48-channel bit data and has a "1" appearing as a $4^{th}$ channel bit, an $8^{th}$ channel bit, a $22^{nd}$ channel bit, a $26^{th}$ channel bit, a $30^{th}$ channel bit, a $44^{th}$ channel bit, and a $48^{th}$ channel bit.

2. A cutting apparatus for recording header data, by exposure, on a master for an information recording medium on which various pieces of information are recorded, comprising:

recording means for recording by exposure (i) a continuously repeated pattern, (ii) an address mark comprising a violation pattern exceeding a run length limitation in a predetermined range, and (iii) address data complying with the run length limitation in the predetermined range, a recording position of which is indicated by the address mark; wherein the address mark is 48-channel bit data and has a "1" appearing as a $4^{th}$ channel bit, an $8^{th}$ channel bit, a $22^{nd}$ channel bit, a $26^{th}$ channel bit, a $30^{th}$ channel bit, a $44^{th}$ channel bit, and a $48^{th}$ channel bit.

3. An information reproducing apparatus for reproducing information recorded on an information recording medium on which various pieces of information are recorded, comprising:

address mark detection means for detecting an address mark from a header field in which (i) a continuously repeated pattern, (ii) an address mark comprising a violation pattern exceeding a run length limitation in a predetermined range, and (iii) address data complying with the run length limitation in the predetermined range, a recording position of which is indicated by the address mark, are recorded; and reproducing means for reproducing the address data in accordance with the address mark detected by the address mark detection means, wherein the address mark is 48-channel bit data and has a "1" appearing as a $4^{th}$ channel bit, an $8^{th}$ channel bit, a $22^{nd}$ channel bit, a $26^{th}$ channel bit, a $30^{th}$ channel bit, a $44^{th}$ channel bit, and a $48^{th}$ channel bit.

* * * * *